(12) United States Patent
Tomic et al.

(10) Patent No.: US 11,218,886 B2
(45) Date of Patent: Jan. 4, 2022

(54) APPARATUS AND METHOD FOR 3-D NETWORK LOCALIZATION

(71) Applicants: Slavisa Tomic, Almada (PT); Marko Beko, Alfragide (PT)

(72) Inventors: Slavisa Tomic, Almada (PT); Marko Beko, Alfragide (PT)

( * ) Notice: Subject to any disclaimer, the term of this patent is extended or adjusted under 35 U.S.C. 154(b) by 0 days.

(21) Appl. No.: 16/226,748

(22) Filed: Dec. 20, 2018

(65) Prior Publication Data

US 2020/0205011 A1 Jun. 25, 2020

(51) Int. Cl.
*H04B 17/318* (2015.01)
*H04B 7/08* (2006.01)
*G01S 5/02* (2010.01)
*G01S 5/12* (2006.01)
*H04W 16/18* (2009.01)
*H04W 16/22* (2009.01)
*H04W 16/28* (2009.01)

(52) U.S. Cl.
CPC .......... *H04W 16/18* (2013.01); *G01S 5/0221* (2013.01); *G01S 5/0252* (2013.01); *G01S 5/12* (2013.01); *H04B 7/0897* (2013.01); *H04B 17/318* (2015.01); *H04W 16/22* (2013.01); *H04W 16/28* (2013.01)

(58) Field of Classification Search
CPC ...... G01S 5/0221; G01S 5/02852; G01S 5/12; H04B 7/0897; H04B 17/318; H04W 16/18; H04W 16/22; H04W 16/28
See application file for complete search history.

(56) References Cited

U.S. PATENT DOCUMENTS

| | | | |
|---|---|---|---|
| 9,749,786 B1 * | 8/2017 | Pandey | H04B 17/318 |
| 10,338,193 B2 * | 7/2019 | Beko | G01S 5/12 |
| 2015/0338937 A1 * | 11/2015 | Shepelev | G06F 3/044 345/179 |
| 2017/0346559 A1 * | 11/2017 | Eroglu | H04B 10/116 |
| 2018/0100915 A1 * | 4/2018 | Beko | G01S 5/12 |
| 2019/0007642 A1 * | 1/2019 | Ju | H04N 21/234345 |

* cited by examiner

*Primary Examiner* — David B Lugo

(57) ABSTRACT

An apparatus and a method for simultaneous localization of multiple targets in 3-D cooperative wireless sensor networks (WSNs), utilizing combined measurements of received signal strength (RSS) and angle of arrival (AoA) are disclosed herein. By exploiting the convenient nature of spherical representation of the considered problem, the measurement models are linearized and a sub-optimal estimator is formulated. The method disclosed herein has a straightforward adaptation to the case where the target's transmit power is also not known. A representative set of simulations and experiments verify the potential performance improvement realized with embodiments of the method for RSS/AoA network localization in 3-D space.

3 Claims, 6 Drawing Sheets

APPARATUS AND METHOD FOR 3-D NETWORK LOCALIZATION

BACKGROUND OF THE INVENTION

Field of the Invention

The present invention relates to 3-D localization in WSN, mobile networks and cooperative wireless networks.

Description of Related Art

Wireless sensor network (WSN) generally refers to a wireless communication network which is composed of a number of devices, called sensors, allocated over a monitored region in order to measure some local quantity of interest [1]. Due to their autonomy in terms of human interaction and low device costs, WSNs find application in various areas, like event detection (fires, floods, hailstorms) [2], monitoring (industrial, agricultural, health care, environmental) [3], [4], energy efficient routing [5], exploration (deep water, underground, outer space) [6], and surveillance [7] to name a few. In many practical applications, data gathered by sensors are only relevant if they are associated with accurate sensors' locations; hence, estimation of sensors' locations is a key requirement for a majority of practical applications [1].

Sensors are small, low cost and low power nodes commonly deployed in large number over a region of interest with limited to non-existing control of their location in space, e.g., thrown out of an aeroplane for sensing in hostile environments [8]. Installing a global navigation satellite system (GNSS) receiver in each sensor would severely augment the network costs and restrict its applicability [9].

In order to maintain low implementation costs, only a small fraction of sensors are equipped with GNSS receivers (called anchors), while the remaining ones (called targets) determine their locations by using a kind of localization scheme that takes advantage of the known anchor locations [10]. Since the sensors have minimal processing capabilities, the key requirement is to develop localization algorithms that are fast, scalable and abstemious in their computational and communication requirements.

Target localization has gained much attention recently due to its significance in both military and industrial applications [11], [12], Wireless localization schemes usually rely on range measurements [13], [14], drawn from time of arrival, received signal strength (RSS), or directional data, drawn from angle of arrival (AoA), or their combination. Notable advance has been made in developing range/angle localization algorithms recently [15]-[21]. In [15], linear least squares (LS) and optimization based estimators were disclosed. An LS and a maximum likelihood (ML) estimators for a hybrid scheme that merges RSS difference (RSSD) and AoA measurements were derived in [16] by employing non-linear constrained optimization. In [17], a selective weighted LS (WLS) estimator for RSS/AoA localization problem was proposed. An estimator based on semidefinite relaxation technique where triplets of points were used to obtain the angle observations was proposed in [18]. Nevertheless, the methods disclosed in [15]-[18] are designed for 2-D scenarios only. Contrarily to these methods, the current application presents a method based on exploiting the convenient nature of spherical representation of the considered problem and proposes a simple solution in a 3-D setting.

Document [19] discloses a WLS estimator for the 3-D RSS/AoA localization problem when the transmitted power, $P_T$, is unknown. However, the authors in [19] only investigated a small-scale WSN, with low noise power. Contrarly to the method dislosed in [19] which only localizes a single target at a time in a non-cooperative fashion, the method disclosed in the present application simultaneously localizes multiple targets in a cooperative manner.

Documents [20] and [21] disclose the RSS/AoA target localization problem in 3-D WSN, for both cases of known and unknown $P_T$. A novel non-convex objective function from the RSS and AoA measurement models that can be transformed into a convex one, by applying second-order cone programing (SOCP) and semidefinite programming (SDP) relaxation techniques in the case of non-cooperative [20] and cooperative localization [21], respectively, were developed. However, relaxation techniques enlarge the set of possible solutions, which might negatively affect accuracy. Moreover, an iterative approach based on bisection procedure for non-cooperative localization is disclosed in [21]. In contrast to [20] and [21], the present application takes advantage of a natural spherical formulation to establish novel relationships between the measurements and the unknown locations of targets, which result in a simple solution, without resorting to any relaxation technique nor iterations.

In [23], a convex optimization-based method for 2-D and 3-D localization is disclosed. The method relies on pair-wise distance measurements between a target whose location is not known and an anchor whose location is known and pair-wise distance measurements between two targets whose locations are not known. The method is based on formulating a sub-problem such that a subset of both anchors and targets is included, where the subset of sensors are chosen according to intelligent rule sets. The location estimates of the targets included in the formed subset are determined by solving an SDP representation of the derived sub-problem. The method then classifies the targets whose locations have been determined as pseudo-anchors, which are used for formulating further sub-problems. The process is repeated iteratively until all target locations are determined. Contrarily to the method disclosed in [23], the WLS method disclosed in the present application utilizes combined RSS/AoA measurements. Furthermore, the WLS method disclosed in the present application provides a solution obtained in a non-repetitive manner such that error propagation is avoided.

Document [24] discloses a hybrid localization method, where due to area conditions, one or more targets switch between different localization techniques in order to enhance the localization accuracy. This hybrid method is based on RSS measurements, and for given area conditions potentially provides the best possible localization accuracy for those conditions. Several localization techniques (e.g., eco-location, centroid, approximate point-in-triangulation, maximum likelihood estimator and proximity) were investigated in [24], and the general idea can be easily extended to any RSS-based localization technique. In contrast to the hybrid method disclosed in [24], the WLS method disclosed in the present application is hybrid in the sense that the two radio measurements of the transmitted signal are merged, namely RSS and AoA measurements. Moreover, the method in the present disclosure does not require the specific area conditions to be known nor to solve the localization problem with other localization techniques other than the proposed WLS one.

In [25], sensor network integration through pheromone fusion (SNIPE) that provides an end-to-end demonstration and integrates self-contained sensor/communication with novel swarming algorithms to detect foot and vehicular movement through a monitored area with minimal configuration and maintenance is disclosed. To locate the target in SNIPE, from all anchors that detect the target only the ones that recognize themselves as the closest anchors are used. These anchors then construct a gradient using a small integer (four bits in the preferred implementation) indicating their distance from the edge. A detecting anchor that hears no edge distance greater than its own knows that it is farthest from the edge; hence, it belongs to the set of the nearest anchors. Then by using the nearest anchors' locations and tactical target location, the target location is determined. Contrarily to the method in [25], the WLS method disclosed in the present application is not directly dependent on anchor density and the number of anchors that detect a given target and does not use gradients.

The disclosure in [26] provides a system having a compressive wireless array for bearing estimation of multiple acoustic sources with a plurality of sensors using a wireless channel under bandwidth constraints. It is shown in [26] that, when the source signals are unknown but incoherent, the high-rate samplers can be eliminated from all but one of the array elements by using a constrained convex optimization algorithm to perform the bearing estimation calculation. This method is important for sensor networks consisting of only arrays, since these networks can significantly outperform the average localization performance of the cheaper proximity sensors in spite of their sheer number per capita. In contrast to [26], the WLS method disclosed in the present application combines the bearing measurements (both azimuth and elevation angles) with the RSS ones.

In document [27], wireless integrated miniature sensing stations, which can be organized into a communicating network to allow sensitive detection and analysis of vibration, infrared radiation, sound, or other physical or condition change indicative of an intruder, vehicle movement, etc. is disclosed. These stations can be placed randomly in the area of interest (e.g., dropped from an aircraft or a ship) and they are programmable to localize themselves in a distributed fashion. However, in huge contrast to the disclosure in the present application, the disclosure in [27] does not provide any kind of localization algorithm for estimating the unknown stations' positions, but rather focuses on the components and characteristics of the sensing stations.

Methods and apparatus for enhancing communications transmitted via wireless mesh networks are disclosed in [28]. These networks include a number of radio nodes organized in a mesh topology, equipped with omnidirectional antennas or directional antennas to transmit large volumes of data. Contrarily to the disclosure in the present application, the disclosure in [28] focuses on network configuration to transmit data at a specific data rate and frequency range, and does not focus on localizing the radio nodes.

The disclosure in [29] provides a wireless computing system composed of wireless access points (APs) able to receive a signal from a user computing device (UCD). The system first calculates an estimation of a location of UCD based on a coarse calculation using AoA of the received signal from UCD. This estimation is used to determine whether or not UCD is likely to be in a favorable location to receive an accurate (full and uninterrupted) signal due to proximity of an AP. In the former case, a fine calculation of the device's location based on a more thorough analysis of the received AoA from a smaller area is performed. Moreover, the system determines another estimate of the UCD's location based on RSS, which is done via triangulation. The two estimates (from AoA and RSS) are then combined together to compute the final estimate of UCD's location. In the latter case, when UCD is not likely in a favorable location, the final estimation is determined according to a combination of a coarse AoA estimate and the RSS one. In contrast to the disclosure in [29], the current one exploits the combined RSS and AoA measurements to cast the considered problem into its more natural framework comprising spherical coordinates, which enables effortless linearization of the measurement model. Moreover, by employing a simple weighting strategy to the linearized model, a solution is derived in a single iteration, in a form of a WLS estimator. Document [30] discloses an extension of the wireless computing system disclosed in [29]. Namely, the wireless computing system may be set to determine UCD's location recurrently within a predefined time period (e.g. every 5, 10, or 20 seconds, or any other suitable period) according to the method disclosed in [29]. It is assumed that the system can store and time-stamp previous estimations for later use. During a pre-established time threshold, the system takes advantage of all previously acquired RSS estimates and combines them with either coarse or fine estimates based on AoA measurements, depending if Lien location is likely or not to be in a favorable location. If the time threshold between the current estimate and the previous one is penetrated, the previous estimate will not be considered for localization improvement in the current step, and the estimation accuracy will depend only on the AoA estimate (coarse or fine) in combination with the current RSS estimate. Unlike the disclosure in [30], the current disclosure requires only a single measurement acquisition and offers a solution in a single iteration. Rather than using RSS-only and AoA-only measurements to get two location estimates like in [30], the current disclosure integrates both RSS and AoA measurements, and by applying a WLS criterion offers a final location estimate.

The disclosure in [31] presents an apparatus and a method for localizing a single target at a time in non-cooperative WSNs. It is assumed that targets can communicate with anchors exclusively (with all of them actually), and that anchors are equipped with the necessary antennas to measure both RSS and AoA quantities. In contrast to [31], the current application considers that the targets have a limited communication range; thus, only some of them can establish a target/anchor link directly. Therefore, in order to acquire the necessary information, in the current application, target cooperation is allowed. As a direct consequence, the targets are also allowed to measure the considered quantities.

The RSS/AoA network localization method in 3-Dspace disclosed in this application merges RSS and AoA observations for the situation where $P_T$ is known, and its generalization to the case where $P_T$ is unknown is straightforward. Low computational complexity and high estimation accuracy are achieved by exploiting the convenient nature of spherical coordinates which allows usto establish new relationships between the measurements and the unknown locations of targes, and results in an efficient solution. Due to its low computational complexity (linear in the number of links) and upfront derivation (without resorting to convex relaxation techniques), the method provides fast and accurate solution. Simulation results validate the accuracy of the proposed method.

INFORMATION DISCLOSURE STATEMENTS

Patents and publications relevant to the patentability of the instant claims, conce Method for 3-D network localization.

[1] N. Patwari. Location Estimation in Sensor Networks. Ph.D. Thesis, University of Michigan, Ann Arbor, Mich., USA, 2005.

[2] Y. Singh, S. Saha, U. Chugh, e C. Gupta, "Distributed Event Detection in Wireless Sensor Networks for Forest Fires," UKSim, pp. 634-639, April 2013.

[3] Z. Rongbai e C. Guohua, "Research on Major Hazard Installations Monitoring System Based on WSN," ICFCC, pp. V1-741-V1-745, Maz 2010.

[4] Z. Dai, S. Wang, and Z. Yan, "BSHM-WSN: A Wireless Sensor Network for Bridge Structure Health Monitoring," ICMIC, pp. 708-712, June 2012.

[5] Lj. Blazevic, J. Y. Le Boudec, e S. Giordano, "A Location-based Routing Method for Mobile Ad Hoc Networks," IEEE Transactions on Mobile Computing, vol. 4, no. 2, pp. 97-110, March 2005.

[6] L. Ghelardoni, A. Ghio, e D. Anguita, "Smart Underwater Wireless Sensor Networks," IEEE!, pp. 1-5, November 2012.

[7] T. He, S. Krishnamurthy, J. A. Stankovic, T. Abdelzaher, L. Luo, R. Stoleru, T. Van, e L. Gu, "Energy-Efficient Surveillance System Using Wireless Sensor Networks," MobiSys, pp. 1-14, June 2004.

[8] L. Buttyain e J. P. Hubaux, Security and Cooperation in Wireless Networks: Thwarting Malicious and Selfish Behavior in the Age of Ubiquitous Computing. Cambridge University Press, New York, N.Y., USA, 2007.

[9] N. Patwari, J. N. Ash, S. Kyperountas, A. O. Hero III, R. L. Moses, e N. S. Correal, "Locating the Nodes: Cooperative Localization in Wireless Sensor Networks," IEEE Signal Processing Magazine, vol. 22, no. 4, pp. 54-69, July 2005.

[10] G. Destino. Positioning in Wireless Networks: Noncooperative and Cooperative Algorithms. Ph.D. Thesis, University of Oulu, Oulu, Finland, 2012.

[11] S. Bartoletti, W. Dai, A. Conti, M. Z. Win, "A Mathematical Model for Wideband Ranging," *IEEE I. Selec. Top. Sign. Process., vol. 9*, no. 2, pp. 216-228, March 2015.

[12] S. Tomic, M. Beko, and R. Dinis, "RSS-based Localization in Wireless Sensor Networks Using Convex Relaxation: Noncooperative and Cooperative Schemes," IEEE Trans. Veh. Technol., vol. 64, no. 5, pp. 2037-2050, May 2015.

[13] S. Tomic, M. Beko, and R. Dinis, "Distributed RSS-AoA Based Localization with Unknown Transmit Powers," *IEEE Wirel. Commun. Letters*, vol. 5, no. 4, pp. 392-395, August 2016.

[14] D. C. Popescu and M. Hedley, "Range Data Correction for Improved Localization," *IEEE Wirel. Commun. Letters, vol.* 4, no. 3, pp. 297-300, June 2015.

[15] K. Yu, "3-D Localization Error Analysis in Wireless Networks," *IEEE Trans. Wirel. Commun.*, vol. 6, no. 10, pp. 3473-3481, October 2007.

[16] S. Wang, B. R. Jackson, and R. Inkol, "Hybrid RSS/AOA Emitter Location Estimation Based on Least Squares and Maximum Likelihood Criteria," *IEEE QBSC*, pp. 24-29, June 2012.

[17] L. Gazzah, L. Najjar, and H. Besbes, "Selective Hybrid RSS/AOA Weighting Algorithm for NLOS Intra Cell Localization," *IEEE WCNC*, pp. 2546-2551, April 2014.

[18] P. Biswas, H. Aghajan, and Y. Ye, "Semidefinite Programming Algorithms for Sensor Network Localization Using Angle of Arrival Information," *Asilomar*, pp. 220-224, October 2005.

[19] Y. T. Chan, F. Chan, W. Read, B. R. Jackson, and B. H. Lee, "Hybrid Localization of an Emitter by Combining Angle-of-Arrival and Received Signal Strength Measurements," *IEEE CCECE*, pp. 1-5, May. 2014.

[20] S. Tomic, L. Marikj, M. Beko, R. Dinis, and N. Órrão, "Hybrid RSS-AoA Technique for 3-D Node Localization in Wireless Sensor Networks," *IWCMC*, pp. 1277-4282, August 2015.

[21] S. Tomic, M. Beko and R. Dinis, "3-D Target Localization in Wireless Sensor Network Using RSS and AoA Measurement," *IEEE Trans. Vehic. Technol.*, vol. 66, no 4, pp. 3197-3210, April 2017.

[22] L. Gazzah, L. Najjar, and H. Besbes,"Selective Hybrid RSS/AOA Approximate Maximum Likelihood Mobile intra cell Localization," *EW*, April 2013.

[23] U.S. Pat. No.: 7,970,574 B2. Scalable Sensor Localization For Wireless Sensor Networks, June 2011.

[24] U.S. Pat. No.: 7,941,157 B2. Hybrid Localization In Wireless Networks, May 2011.

[25] U.S. Pat. No.: 7,480,395 B2. Decentralized Detection, Localization, And Tracking Utilizing Distributed Sensors, January 2009.

[26] U.S. Pat. No.: 2010/0265799 A1. Compressive Sensing System And Method For Bearing Estimation Of Sparse Sources In The Angle Domain, October 2010.

[27] U.S. Pat. No.: 6,208,247 B1. Wireless Integrated Sensor Network Using Multiple Relayed Communications, March 2001.

[28] U.S. Pat. No.: 2012/0326927 A1. Apparatus And Method For Enhancing Wireless Mesh Network Communications, Dec. 2012.

[29] U.S. Pat. No.: 2017/9749786 B1. Determining Location Via Wireless Signal Attributes, August 2017.

[30] U.S. Pat. No.: 2017/0208281A1. Determining Location Via Current and Previous Wireless Signal Attributes, September 2017.

[31] U.S. Pat. No.: 2018/0100915A1. Apparatus and method for RSS/AoA target 3-D localization in wireless networks, April 2018.

[32] T. S. Rappaport. *Wireless Communications: Principles and Practice*. Prentice-Hall: Upper Saddle River, N.J. , USA, 1996.

[33] M. B. Ferreira, J. Gomes, and J. P. Costeira, "A Unified Approach for Hybrid Source Localization Based on Ranges and Video," *IEEE ICASSP*, pp. 2879-2883, April 2015.

[34] S. M. Kay. *Fundamentals of Statistical Signal Processing: Estimation Theory*. Prentice-Hall: Upper Saddle River, N.J., USA, 1993

[35] K. V. Mardia. Statistics of Directional Data. Academic Press, Inc.: 24/28Oval Road, London, England, 1972.

[36] C. Forbes, M. E. Evans, N. Hastings, and B. Peacock. *Statistical Distributions*. Fourth Edition, John Wiley & Sons, Inc.: Hoboken, N.J., USA, 2011.

[37] M. W. Khan, N. Salman, and A. H. Kemp, "Optimised Hybrid Localisation with Cooperation in Wireless Sensor Networks," *IET Sign. Process.*, vol. 11, no. 3, pp. 341-348, May. 2017.

BRIEF SUMMARY OF THE INVENTION

As shown in FIG. 2. $x_i=[x_{ix},x_{iy},x_{iz}]^T$ and $\alpha_x=[\alpha_{jx},\alpha_{jy},\alpha_{jz}]^T$ represent the coordinates of the i-th target and the j-th anchor, respectively, while $d_{ij}$, $\phi_{ij}$ and $\alpha_{ij}$ denote respectively the distance, azimuth angle and elevation angle between thei-th target and the j-th anchor.

Let us consider a connected 3-D network with M targets (unknown locations) and N anchors (known locations) whose true locations are denoted by $x_i \in \mathbb{R}^3$ for i=1, . . . , M and $\alpha_j \in \mathbb{R}^3$ for $j=1, \ldots, N$, respectively. Here, it is assumed that the communication range, R, of the targets is limited. Hence, in order to acquire sufficient amount of measurements, target cooperation is allowed, i.e., a target can communicate with any sensor within its communication range. Moreover, the distance is drawn from the RSS information exclusively, since ranging based on RSS does not require additional hardware [1]. The noise-free RSS between i-th and j-th sensors is defined as [32, Ch.3]

$$P_{ij}(W) = P_T \left(\frac{d_0}{d_{ij}}\right)^\gamma 10^{-\frac{L_0}{10}}, \forall (i, j) \in \varepsilon \quad (1)$$

where $P_T$ is the transmit power of the target, $$L_0 = 10\log_{10}\frac{P_T}{P_0}$$

is the path loss value measured at a short reference distance $d_0 (d_0 \leq d_{ij})$ and $P_0$ is the received signal strength (RSS) at $d_0$, y is the path loss exponent (PLE), and $d_{ij}$ is the distance between sensors i and j. Furthermore, the tuple set $\varepsilon = \{(i,j): \|x_i - s_j\| \leq R, \text{ for } i=1, \ldots, N, j=1, \ldots, M, M+1, \ldots, M+N, i \neq j\}$ denotes the existance of an edge between two sensors. The RSS model in (1) can be rewritten in a logarithmic form as $$P_{ij} = P_0 - 10\gamma\log_{10}\frac{\|x_i - s_j\|}{d_0} + n_{ij}, \forall (i, j) \in \varepsilon \quad (2)$$

where $S_j$ is the j-th neighboring sensor (either a target or an anchor), and $n_{ij} \sim \mathcal{N}(0, \sigma_{n_{ij}}^2)$ is the log-normal shadowing term modeled as zero-mean Gaussian random variable with variance $\sigma_{n_{ij}}^2$.

The AoA measurements can be obtained by installing directional antenna or antenna array [15], or even video cameras [33]) at sensors. Thus, by applying simple geometry, azimuth and elevation angle measurements are modeled respectively as [5]:

$$\phi_{ij} = \tilde{\phi}_{ij} + m_{ij}, \forall (i,j) \in \varepsilon \quad (3a)$$

$$\alpha_{ij} = \tilde{\alpha}_{ij} + v_{ij}, \forall (i,j) \in \varepsilon \quad (3b)$$

where $$\tilde{\phi}_{ij} = \tan^{-1}\left(\frac{x_{iy} - s_{jy}}{x_{ix} - s_{jx}}\right), \tilde{\alpha}_{ij} = \cos^{-1}\left(\frac{x_{iz} - s_{jz}}{\|x_i - s_j\|}\right),$$

and $m_{ij}$ and $v_{ij}$ are the measurement errors of the azimuth and the elevation angles respectively, modeled as a zero-mean von Mises random variables with the concentration parameters, $\kappa_{m_{ij}}, \kappa_{v_{ij}} \in [0, \infty)$, i.e., $m_{ij} \sim \mathcal{VM}(0, \kappa_{m_{ij}})$ and $v_{ij} \sim \mathcal{VM}(0, \kappa_{v_{ij}})$. Without loss of generality, we assume that $\kappa_{m_{ij}} = \kappa_{v_{ij}} = \kappa_{ij}$. The von Mises distribution is a circular analogue of the Gaussian one, and since we are dealing with directional data here, it comes more natural to consider this distribution rather than the Gaussian one [35], [36]. The mean direction and the concentration parameter can be related to the mean and variance in the Gaussian distribution 35], [36].

For the sake of simplicity, we stack all unknown vectors into a single matrix, i.e., $X = [x_1, \ldots, x_M]$, $(x \in \mathbb{R}^{3 \times M})$. From (2), the conditional probability density function (PDF) of an RSS observation is given $$f(P_{ij} | X) = \frac{1}{\sqrt{2\pi\sigma_{n_{ij}}^2}} \exp\left\{-\frac{\left(P_{ij} - P_0 + 10\gamma\log_{10}\frac{d_{ij}}{d_0}\right)^2}{2\sigma_{n_{ij}}^2}\right\}. \quad (4)$$

Similarly, from (3) we can write the conditional PDF of an azimuth and elevation observations as $$f(\phi_{ij} | X) = \frac{1}{2\pi I_0(\kappa_{ij})} \exp\{\kappa_{ij} \cos(\phi_{ij} - \tilde{\phi}_{ij})\}, \quad (5a)$$

$$f(\alpha_{ij} | X) = \frac{1}{2\pi I_0(\kappa_{ij})} \exp\{\kappa_{ij} \cos(\alpha_{ij} - \tilde{\alpha}_{ij})\}, \quad (5b)$$

where $I_k(*)$ is the modified Bessel function of first kind of order k [35], [36].

By maximizing (4) and (5), a maximum likelihood (ML) estimator of X can be obtained, $$\hat{x} = \underset{x}{\arg\min} \sum_{(i,j) \in \varepsilon} \left(\frac{1}{\sigma_{n_{ij}}^2}\left(P_{ij} - P_0 + 10\gamma\log_{10}\frac{\|x_i - s_j\|}{d_0}\right)\right)^2 + \quad (6)$$

$$\sum_{(i,j) \in \varepsilon} \kappa_{ij} \cos(\phi_{ij} - \tilde{\phi}_{ij}) + \sum_{(i,j) \in \varepsilon} \kappa_{ij} \cos(\alpha_{ij} - \tilde{\alpha}_{ij}).$$

Although the ML solution is asymptotically optimal, the problem in (5) is highly non-convex with no closed-form solution. Therefore, we propose a sub-optimal approach.

The 3-D localization method in wireless networks comprises the following steps:

a. First, from (4), the distance that best estimates $\|x_i - \alpha_j\|$ in the ML sense is:

$$\hat{d}_{ij} = d_0 10^{\frac{P_0 - P_{ij}}{10\gamma}}; \quad (7)$$

b. similarly, from (5), the angles which best estimate $\phi_{ij}$ and $\alpha_{ij}$ in the ML sense are respectively $$\hat{\phi}_{ij} = \tan^{-1}\left(\frac{x_{iy} - s_{jy}}{x_{ix} - s_{jx}}\right), \quad (8a)$$

$$\hat{\alpha}_{ij} = \cos^{-1}\left(\frac{x_{iz} - s_{jz}}{\|x_i - s_j\|}\right), \quad (8b)$$

since (5) is maximized when the cosines in the arguments are equal to 1, i.e., when $\hat{\phi}_{ij} = \tilde{\phi}_{ij}$ and $\hat{\alpha}_{ij} = \tilde{\alpha}_{ij}$;

c. from (7) and (8), we can respectively write $$\lambda_{ij}\|x_i - s_j\| \approx \eta d_0, \quad (9)$$

$$c_{ij}^T(x_i - s_j) \approx 0, \quad (10a)$$

$$i k^T(x_i - s_j) \approx \|x_i - s_j\|\cos(\alpha_{ij}), \quad (10b)$$

where $$\lambda_{ij} = 10^{\frac{P_{ij}}{10\gamma}}, \eta = 10^{\frac{P_0}{10\gamma}},$$

$c_{ij}=[-\sin(\phi_{ij}),\cos(\phi_{ij}),0]^T$, and $k=[0,0,1]^T$. If we switch from Cartesian to spherical coordinates, we can write $x_i-s_j=r_{ij}u_{ij}$, with $r_{ij}\geq 0$ and $\|u_{ij}\|=1$, i.e., $u_{ij}=\cos(\phi_{ij})\sin(\alpha_{ij}),\sin(\phi_{ij})\sin(\alpha_{ij})$, $\cos(\Delta_{ij})^T$ is the estimated unit vector;

d. next, apply the described conversion to (9) and (10b), and multiply with 1 (formed as $u_{ij}^T u_{ij}$), to respectively get:

$$\lambda_{ij}u_{ij}^T r_{ij}u_{ij} \approx \eta d_0 \Leftrightarrow \lambda_{ij}u_{ij}^T(x_i-s_j) \approx \eta d_0, \quad (11)$$

and $$k^T r_{ij}u_{ij} \approx u_{ij}^T r_{ij}u_{ij} \cos(\alpha_{ij}) \Leftrightarrow (\cos(\alpha_{ij})u_{ij}-k)^T(x_i-s_j) \approx 0; \quad (12)$$

e. to give more importance to nearby links, introduce weights, $w=[\sqrt{w_{ij}}]$, where each $w_{ij}$ is defined as $$w_{ij} = 1 - \frac{\hat{d}_{ij}}{\sum_{(i,j)\in\varepsilon} \hat{d}_{ij}}; \quad (13)$$

f. next, according to the WLS criterion and (11), (10a), (12) and (13), obtain the following estimator:

$$\hat{x} = \underset{x}{\operatorname{argmin}} \sum_{(i,j)\in\varepsilon} w_{ij}(\lambda_{ij}u_{ij}^T(x_i-s_j) - \eta d_0)^2 + \quad (14)$$
$$\sum_{(i,j)\in\varepsilon} w_{ij}(c_{ij}^T(x_i-s_j))^2 + \sum_{(i,j)\in\varepsilon} w_{ij}((\cos(\alpha_{ij})u_{ij}-k)^T(x_i-s_j))^2,$$

which can be writen as $$\underset{x}{\operatorname{minimize}} \|W(Ax-b)\|^2, \quad (15)$$

where $x=[x_1, x_2, \ldots, x_M]^T$, ($x \in \mathbb{R}^{3M\times 1}$), $W=1_3 \otimes \operatorname{diag}(w)$, with $\otimes$ denoting the Kronecker product, and $A_{t,3(i-1)+1:3i}=\lambda_{ij}u_{ij}^T$, $b_t=\lambda_{ij}u_{ij}^T\alpha_{ij}+\eta d_0$, $\forall(i,j)\in \mathcal{E}_A$, $t=1,\ldots,|\mathcal{E}_A|$;

$A_{t,3(i-1)+1:3i}=c_{ij}^T$, $b_t=c_{ij}^T\alpha_{ij}$, $\forall(i,j)\in\mathcal{E}_A$, $t=|\mathcal{E}_A|+1,\ldots,2|\mathcal{E}_A|$;

$A_{t,3(i-1)+1:3i}=(\cos(\alpha_{ij})u_{ij}-k)^T$, $b_t=(\cos(\alpha_{ij})u_{ij}-k)^T\alpha_j$, $\forall(i,j)\in\mathcal{E}_A$, $t=2|\mathcal{E}_A|+1,\ldots,3|\mathcal{E}_A|$;

$A_{t,[3(i-1)+1:3i,\ 3(j-1)+1:3j]}=[c_{ij}^T,-c_{ij}^T]$, $b_t=0$, $\forall(i,j)\in\mathcal{E}_T$, $t=3|\mathcal{E}_A|+1,\ldots,3|\mathcal{E}_A|+|\mathcal{E}_T|$;

$A_{t,[3(i-1)+1:3i,\ 3(j-1)+1:3j]}=[c_{ij}^T,-c_{ij}^T]$, $b_t=0$, $\forall(i,j)\in\mathcal{E}_T$, $t=3|\mathcal{E}_A|+|\mathcal{E}_T|+1,\ldots,3|\mathcal{E}_A|+2|\mathcal{E}_T|$;

$A_{t,[3(i-1)+1:3i,\ 3(j-1)+1:3j]}=[(\cos(\alpha_{ij})u_{ij}-k)^T,$
$-(\cos(\alpha_{ij})u_{ij}-k)^T]$, $b_t=0$, $\forall(i,j)\in\mathcal{E}_T$, $t=3|\mathcal{E}_A|+2|\mathcal{E}_T|+1,\ldots,3|\mathcal{E}_A|+3|\mathcal{E}_T|$;

with $\mathcal{E}_A$ and $\mathcal{E}_T$ denoting the tuple sets of all target/anchor and target/target edges respectively, and $|*|$ representing the cardinality of a set. The solution to (15) is given as $$\hat{x}=(A^T W^T W A)^{-1} A^T W^T b).$$

BRIEF DESCRIPTION OF DRAWINGS

Various aspects of embodiments disclosed here, including features and advantages of the present invention outlined above, are described in detail together with the drawings, where like reference numerals refer to like elements throughout, in which.

DETAILED DESCRIPTION OF THE INVENTION

Figure 2:
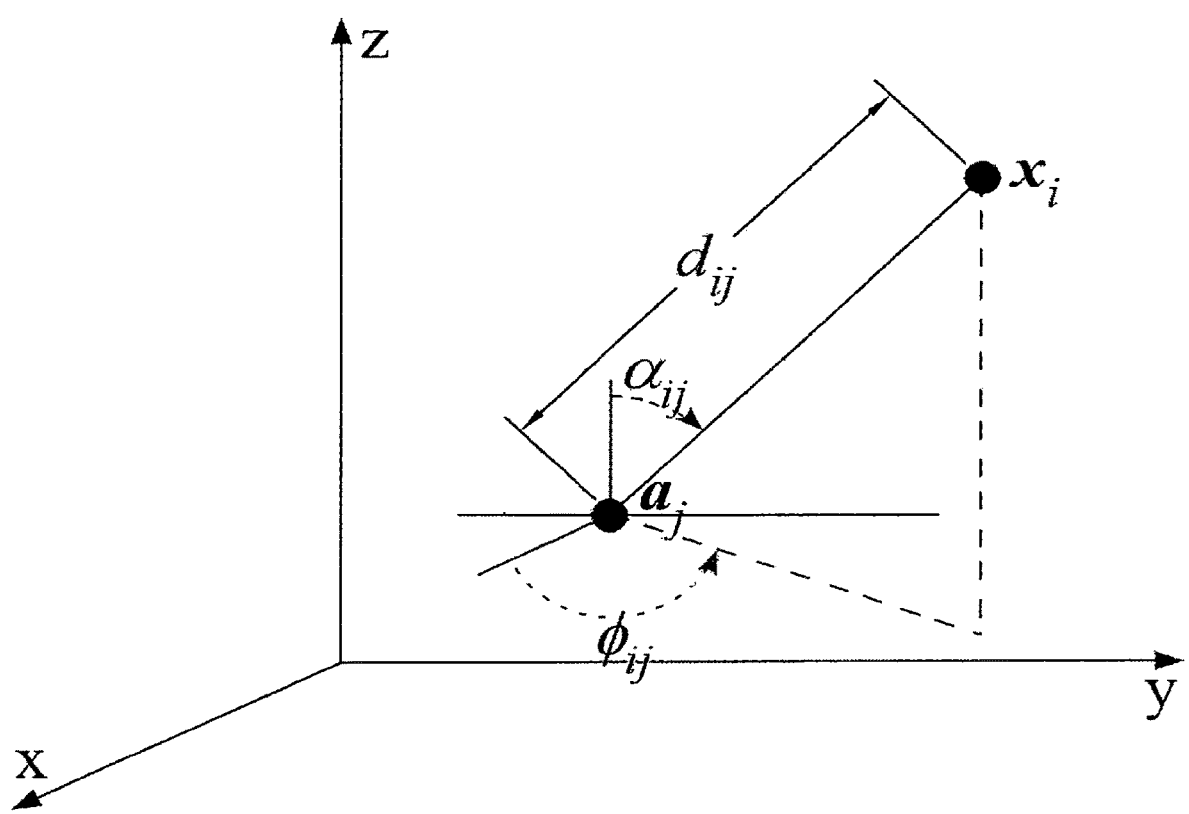
FIG. 2 shows the geometry of the problem, i.e., it depicts an anchor and a target locations in a 3-D space, where $x_i=[x_{ix},x_{iy},x_{iz}]^T$ and $\alpha_j=[\alpha_{jx},\alpha_{jy},\alpha_{jz}]^T$ represent the coordinates of the i-th target and the j-th anchor, respectively, while $d_{ij}$, $\phi_{ij}$ and $\alpha_{ij}$ denote respectively the distance, the azimuth angle and the elevation angle between the i-th target and the j-th anchor.

The present application describes the apparatus and a method for network localization based on integrated RSS and AoA measurements in 3-D space. Let $x_i \in \mathbb{R}^3$ be the unknown location of the i-th target (i=1, ..., M) and $\alpha_j \in \mathbb{R}^3$ be the known location of the j-th anchor (j=1, ..., N). As shown in FIG. 2. $x_i=[x_{ix},x_{iy},x^{iz}]^T$ and $\alpha_j=[\alpha_{jx},\alpha_{jy},\alpha_{jz}]^T$ represent the coordinates of the i-th target and the j-th anchor, respectively, while $d_{ij}$, $\phi_{ij}$ and $\alpha_{ij}$ denote respectively the distance, the azimuth angle and the elevation angle between the i-th target and the j-th anchor.

Figure 1:
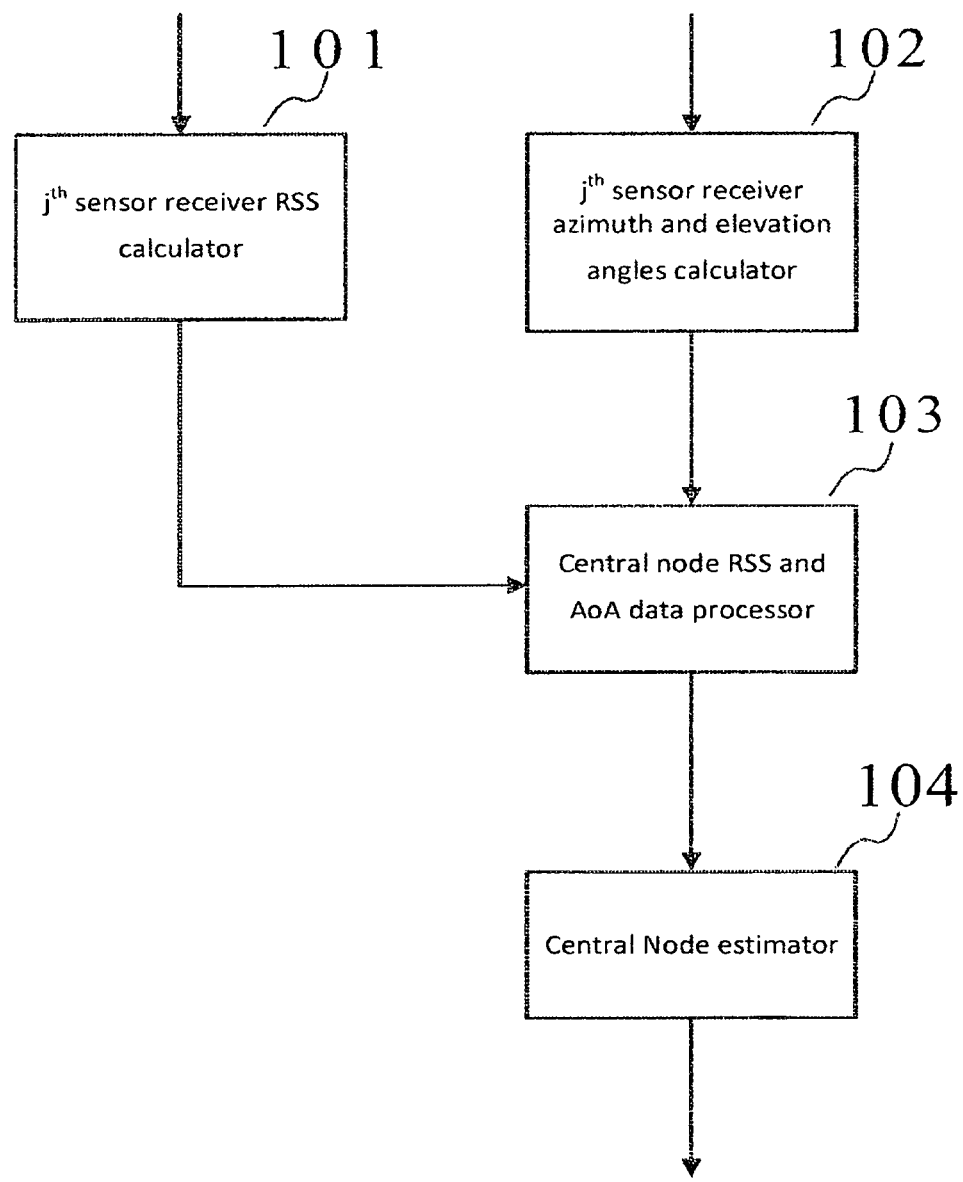
FIG. 1 is a block diagram of the localization apparatus, where block 101 represents the j th sensor receiver that receives the signal sent from the i-th target. The receiver gives as output RSS measurements. Block 102 is the j-th sensor receiver that receives the signal sent from the i-th target and calculates the azimuth and the elevation angles, giving these values as the output. Note that any sensor can have multiple antennas or directional antennas for extracting AoA measurements, i.e., azimuth and elevation angles. Block 103 is a central node (fusion center), which gathers all RSS and AoA measurements acquired in the network and carries out all data processing. The block 104 represents the central node with the proposed estimator adapted to the case where the transmit power is not known.

The determination of the locations is done by using a hybrid system that combines distance and angle measurements obtained at the blocks 101 and 102 of FIG. 1, respectively. The combination of the two radio signal measurements provides more information for the user and is capable of enhancing estimation accuracy.

It is assumed that the distance is drawn in 101 from the RSS information exclusively, since ranging based on RSS does not require additional hardware [1]. The noise-free RSS between two sensors i and j is defined as [32, Ch.3]

$$P_{ij}(W) = P_T \left(\frac{d_0}{d_{ij}}\right)^\gamma 10^{-\frac{L_0}{10}}, \forall (i,j) \in \varepsilon \qquad (1)$$

where $P_T$ is the transmit power of the target, $$L_0 = 10\log_{10}\frac{P_T}{P_0} \qquad$$

is the path loss value measured at a short reference distance $d_0$ ($d_0 \leq d_{ij}$) and $P_0$ is the received signal strength (RSS) at $d_0$, $\gamma$ is the path loss exponent (PLE), and $d_{ij}$ is the distance between sensors i and j. Furthermore, the tuple set $\varepsilon=\{(i,j): \|x_i-s_j\| \leq R, \text{ for } i=1,\ldots,N, j=1,\ldots,M, M+1,\ldots,M+N, i\neq j\}$ denotes the existance of an edge between two sensors. The RSS model in (1) can be rewritten in a logarithmic form as $$P_{ij} = P_0 - 10\gamma\log_{10}\frac{\|x_i - s_j\|}{d_0} + n_{ij}, \forall (i,j) \in \varepsilon \qquad (2)$$

where $s_j$ is the j-th neighboring sensor (either a target or an anchor) of the i-th target and $n_{ij} \sim \mathcal{N}(0,\sigma_{n_{ij}}^2)$ is the log-normal shadowing term modeled as zero-mean Gaussian random variable with variance $\sigma_{n_{ij}}^2$. It is assumed that all sensors are static during the estimation process and there is no sensor and/or link failure, and all sensors may transmit their measurements to a central processor represented by the block 103 in FIG. 1.

The AoA measurements acquired within the block 102 can be obtained by installing directional antenna or antenna array [15], or even video cameras [33]) at sensors. Thus, in 102, by applying simple geometry, azimuth and elevation angle measurements are modeled respectively as [5]:

$$\phi_{ij} = \tilde{\phi}_{ij} + m_{ij}, \forall (i,j) \in \varepsilon \qquad (3a)$$

$$\alpha_{ij} = \tilde{\alpha}_{ij} + v_{ij}, \forall (i,j) \in \varepsilon \qquad (3n)$$

where $$\tilde{\phi}_{ij} = \tan^{-1}\left(\frac{x_{iy} - s_{jy}}{x_{ix} - s_{jx}}\right), \tilde{\alpha}_{ij} = \cos^{-1}\left(\frac{x_{iz} - s_{jz}}{\|x_i - s_j\|}\right),$$

and $m_{ij}$ and $v_{ij}$ are the measurement errors of the azimuth and the elevation angles respectively, modeled as a zero-mean von Mises random variables with the concentration parameters, $\kappa_{m_{ij}}$, $\kappa_{v_{ij}} \in [0,\infty)$, i.e., $m_{ij} \sim \mathcal{VM}(0,\kappa_{m_{ij}})$ and $v_{ij} \sim \mathcal{VM}(0,\kappa_{v_{ij}})$. Without loss of generality, we assume that $\kappa_{m_{ij}} = \kappa_{v_{ij}} = \kappa_{ij}$. The von Mises distribution is a circular analogue of the Gaussian one, and since we are dealing with directional data here, it comes more natural to consider this distribution rather than the Gaussian one [35], [36]. The mean direction and the concentration parameter can be related to the mean and variance in the Gaussian distribution [35], [36].

For the sake of simplicity, we stack all unknown vectors into a single matrix, i.e., $X=[x_1,\ldots,x_M]$, ($X \in \mathbb{R}^{3 \times M}$). From (2), the conditional probability density function (PDF) of an RSS observation is given $$f(P_{ij}|X) = \frac{1}{\sqrt{2\pi\sigma_{n_{ij}}^2}}\exp\left\{-\frac{\left(P_{ij} - P_0 + 10\gamma\log_{10}\frac{d_{ij}}{d_o}\right)^2}{2\sigma_{n_{ij}}^2}\right\}. \qquad (4)$$

Similarly, from (3) we can write the conditional PDF of an azimuth and elevation observations as $$f(\phi_{ij}|X) = \frac{1}{2\pi I_0(\kappa_{ij})}\exp\{\kappa_{ij}\cos(\phi_{ij} - \tilde{\phi}_{ij})\}, \qquad (5a)$$

$$f(\alpha_{ij}|X) = \frac{1}{2\pi I_0(\kappa_{ij})}\exp\{\kappa_{ij}\cos(\alpha_{ij} - \tilde{\alpha}_{ij})\}, \qquad (5b)$$

where $I_k(*)$ is the modified Bessel function of first kind of order k [35], [36].

By maximizing (4) and (5), a maximum likelihood (ML) estimator of X can be obtained [34, Ch. 7], i.e., $$\hat{X} = \underset{X}{\operatorname{argmin}} \sum_{(i,j)\in\varepsilon}\left(\frac{1}{\sigma_{n_{ij}}^2}\left(P_{ij} - P_0 + 10\gamma\log_{10}\frac{\|x_i - s_j\|}{d_0}\right)\right)^2 + \qquad (6)$$

$$\sum_{(i,j)\in\varepsilon}\kappa_{ij}\cos(\phi_{ij} - \tilde{\phi}_{ij}) + \sum_{(i,j)\in\varepsilon}\kappa_{ij}\cos(\alpha_{ij} - \tilde{\alpha}_{ij}).$$

Although the ML solution is asymptotically optimal, the problem in (5) is highly non-convex with no closed-form solution. The 3-D localization method in wireless networks disclosed in this application is implemented in the block 104, and it aproximates (6) by another estimator whose solution is found efficiently, and it is comprises the following steps:

First, from (4), the distance that best estimates $\|x_i-\alpha_j\|$ in the ML sense is:

$$\hat{d}_{ij} = d_0 10^{\frac{P_0 - P_{ij}}{10\gamma}}. \qquad (7)$$

Similarly, from (5), the angles which best estimate $\phi_{ij}$ and $\alpha_{ij}$ in the ML sense are respectively $$\hat{\phi}_{ij} = \tan^{-1}\left(\frac{x_{iy} - s_{jy}}{x_{ix} - s_{jx}}\right), \qquad (8a)$$

$$\hat{\alpha}_{ij} = \cos^{-1}\left(\frac{x_{iz} - s_{jz}}{\|x_i - s_j\|}\right), \qquad (8b)$$

since (5) is maximized when the cosines in the arguments are equal to 1, i.e., when $\hat{\phi}_{ij} = \tilde{\phi}_{ij}$ and $\hat{\alpha}_{ij} = \tilde{\alpha}_{ij}$.

From (7) and (8), we can respectively write $$\lambda_{ij}\|x_i - s_j\| \approx \phi d_0, \qquad (9)$$

$$c_{ij}^T(x_i - s_j) \approx 0, \qquad (10a)$$

$$k^T(x_i - s_j) \approx \|x_i - s_j\|\cos(\alpha_{ij}), \qquad (10b)$$

where $$\lambda_{ij} = 10^{\frac{P_{ij}}{10\gamma}}, \eta = 10^{\frac{P_0}{10\gamma}},$$

$c_{ij}=[-\sin(\phi_{ij}), \cos(\phi_{ij}),0]^T$ and $k=[0,0,1]^T$. If we switch from Cartesian to spherical coordinates, we can write $x_i-s_j=r_{ij}u_{ij}$, with $r_{ij} \geq 0$ and $\|u_{ij}\|=1$, i.e., $u_{ij}=[\cos(\phi_{ij})\sin(\alpha_{ij}),\sin(\phi_{ij})\sin(\alpha_{ij}), \cos(\alpha_{ij})]^T$ is the estimated unit vector.

Apply the described conversion to (9) and (10b), and multiply with 1 (formed as $u_{ij}^T u_{ij}$), to respectively get:

$$\lambda_{ij}u_{ij}^T r_{ij}u_{ij} \approx \eta d_0 \Leftrightarrow \lambda_{ij}u_{ij}^T(x_i-s_j) \approx \eta d_0, \quad (11)$$

and $$k^T r_{ij}u_{ij} \approx u_{ij}^T r_{ij}u_{ij}\cos(\alpha_{ij}) \Leftrightarrow (\cos(\alpha_{ij})u_{ij}-k)^T(x_i-s_j) \approx 0. \quad (12)$$

To give more importance to nearby links, introduce weights, $w=[\sqrt{w_{ij}}]$, where each $w_{ij}$ is defined as $$w_{ij} = 1 - \frac{\hat{d}_{ij}}{\sum_{(i,j) \in \varepsilon} \hat{d}_{ij}}. \quad (13)$$

Next, according to the WLS criterion and (11), (10a), (12) and (13), obtain the following estimator:

$$\hat{X} = \underset{X}{\operatorname{argmin}} \sum_{(i,j) \in \varepsilon} w_{ij}(\lambda_{ij}u_{ij}^T(x_i - s_j) - \eta d_0)^2 + \quad (14)$$

$$\sum_{(i,j) \in \varepsilon} w_{ij}(c_{ij}^T(x_i - s_j))^2 + \sum_{(i,j) \in \varepsilon} w_{ij}((\cos(\alpha_{ij})u_{ij} - k)^T(x_i - s_j))^2,$$

which can be writers as $$\underset{x}{\operatorname{minimize}} \|W(Ax - b)\|^2, \quad (15)$$

where $x=[x_1, x_2, \ldots, x_M]^T$, $(x \in \mathbb{R}^{3M \times 1})$, $W=I_3 \otimes \operatorname{diag}(w)$, with $\otimes$ denoting the Kronecker product, and $A_{t,3(i-1)+1:3i} = \lambda_{ij}u_{ij}^T$, $b_t = \lambda_{ij}u_{ij}^T \alpha_{ij} + \eta d_0$, $\forall (i,j) \in \mathcal{E}_A$, $t=1, \ldots, |\mathcal{E}_A|$;

$A_{t,3(i-1)+1:3i} = c_{ij}^T$, $b_t = c_{ij}^T \alpha_{ij}$, $\forall (i,j) \in \mathcal{E}_A$, $t=|\mathcal{E}_A|+1, \ldots, 2|\mathcal{E}_A|$;

$A_{t,3(i-1)+1:3i} = (\cos(\alpha_{ij})u_{ij}-k)^T$, $b_t = (\cos(\alpha_{ij})u_{ij}-k)^T \alpha_j$, $\forall (i,j) \in \mathcal{E}_A$, $t=2|\mathcal{E}_A|+1, \ldots, 3|\mathcal{E}_A|$;

$A_{t,[3(i-1)+1:3i, \ 3(j-1)+1:3j]} = [c_{ij}^T, -c_{ij}^T]$, $b_t=0$, $\forall (i,j) \in \mathcal{E}_T$, $t=3|\mathcal{E}_A|+1, \ldots, 3|\mathcal{E}_A|+|\mathcal{E}_T|$;

$A_{t,[3(i-1)+1:3i, \ 3(j-1)+1:3j]}[c_{ij}^T, -c_{ij}^T]$, $b_t=0$, $\forall (i,j) \in \mathcal{E}_T$, $t=3|\mathcal{E}_A|+|\mathcal{E}_T|+1, \ldots, 3|\mathcal{E}_A|+2|\mathcal{E}_T|$;

$A_{t,[3(i-1)+1:3i, \ 3(j-1)+1:3j]} = [(\cos(\alpha_{ij})u_{ij}-k)^T, -(\cos(\alpha_{ij})u_{ij}-k)^T]$, $b_t=0$, $\forall (i,j) \in \mathcal{E}_T$, $t=3|\mathcal{E}_A|+2|\mathcal{E}_T|+1, \ldots, 3|\mathcal{E}_A|+3|\mathcal{E}_T|$;

with $\mathcal{E}_A$ and $\mathcal{E}_T$ denoting the tuple sets of all target/anchor and target/target edges respectively, and $|*|$ representing the cardinality of a set. The solution to (15) is given as $$\hat{x}=(A^T W^T W A)^{-1}(A^T W^T b).$$

When the transmitted power information, $P_T$, is not known, it translates to $\eta$ in (9) being unknown. In such a case, the derivation procedure is somewhat different, and it goes as follows.

To give more importance to nearby links, introduce weights, $\hat{w}=[\sqrt{\tilde{w}_{ij}}]$, where each $\tilde{w}_{ij}$ is defined as $$\tilde{w}_{ij} = 1 - \frac{P_{ij}}{\sum_{(i,j) \in \varepsilon} P_{ij}}; \quad (16)$$

According to the WLS criterion and (11), (10a), (12) and (16), obtain the following estimator:

$$\hat{X} = \underset{X,\eta}{\operatorname{argmin}} \sum_{(i,j) \in \varepsilon} \tilde{w}_{ij}(\lambda_{ij}u_{ij}^T(x_i - s_j) - \eta d_0)^2 + \quad (17)$$

$$\sum_{(i,j) \in \varepsilon} \tilde{w}_{ij}(c_{ij}^T(x_i - s_j))^2 + \sum_{(i,j) \in \varepsilon} \tilde{w}_{ij}((\cos(\alpha_{ij})u_{ij} - k)^T(x_i - s_j))^2,$$

which can be writes as $$\underset{y}{\operatorname{minimize}} \|\tilde{W}(\tilde{A}y - \tilde{b})\|^2, \quad (18)$$

where $y=[x_1, x_2, \ldots, x_M, \eta]^T$, $(y \in \mathbb{R}^{(3M+1) \times 1})$, $\tilde{W}=I_3 \otimes \operatorname{diag}(\tilde{w})$, and $\tilde{A}_t=[A_t, -d_0]$, $\tilde{b}_t=\lambda_{ij}u_{ij}^T \alpha_{ij}$, $\forall (i,j) \in \mathcal{E}_A$, $t=1, \ldots, |\mathcal{E}_A|$;

$\tilde{A}_t=[A_t, 0]$, $\tilde{b}_t=c_{ij}^T \alpha_{ij}$, $\forall (i,j) \in \mathcal{E}_A$, $t=|\mathcal{E}_A|+1, \ldots, 2|\mathcal{E}_A|$;

$\tilde{A}_t=[A_t, 0]$, $\tilde{b}_t=(\cos(\alpha_{ij})u_{ij}-k)^T \alpha_j$, $\forall (i,j) \in \mathcal{E}_A$, $t=2|\mathcal{E}_A|+1, \ldots, 3|\mathcal{E}_A|$;

$\tilde{A}_t=[A_t, -d_0]$, $\tilde{b}_t=0$, $\forall (i,j) \in \mathcal{E}_T$, $t=3|\mathcal{E}_A|+1, \ldots, 3|\mathcal{E}_A|+|\mathcal{E}_T|$;

$\tilde{A}_t=[A_t, 0]$, $\tilde{b}_t=0$, $\forall (i,j) \in \mathcal{E}_T$, $t=3|\mathcal{E}_A|+|\mathcal{E}_T|+1, \ldots, 3|\mathcal{E}_A|+2|\mathcal{E}_T|$;

$\tilde{A}_t=[A_t, 0]$, $\tilde{b}_t=0$, $\forall (i,j) \in \mathcal{E}_T$, $t=3|\mathcal{E}_A|+2|\mathcal{E}_T|+1, \ldots, 3|\mathcal{E}_A|+3|\mathcal{E}_T|$.

The solution of (18) is given as $$\tilde{y}=(\tilde{A}^T \tilde{W}^T \tilde{W} \tilde{A})^{-1}(\tilde{A}^T \tilde{W}^T \tilde{b}).$$

Table 1 provides an overview of the considered algorithms together with their worst case computational complexities.

TABLE 1

Summary of the Considered Algorithms

| Algorithm | Descripton | Complexity |
|---|---|---|
| WLS | The proposed WLS method for known $P_T$ | $O\left(MN + \frac{M(M-1)}{2}\right)$ |
| WLS-U | The proposed WLS method for unknown $P_T$ | $O\left(MN + \frac{M(M-1)}{2}\right)$ |

TABLE 1-continued

Summary of the Considered Algorithms

| Algorithm | Descripton | Complexity |
|---|---|---|
| LLS | The LLS method disclosed in [37] | $O\left(MN + \frac{M(M-1)}{2}\right)$ |
| SDP | The SDP method disclosed in [21] | $O\left(M^{4.5}\left(N + \frac{M}{2}\right)^2\right)$ |

Table 1 shows that the computational complexity of the considered methods depends mainly on the network size, i.e., the total number of sensors in the network. This property is a characteristic of methods operating in a centralized manner [21], where all information is conveyed to a central processor. From Table 1, we can see that the computational complexity of the proposed method is linear.

Performance of the proposed algorithm was verified through computer simulations. It was assumed that radio measurements were generated by using (2), (3) and (4). All sensors were deployed randomly inside a box with an edge length B=10 m in each Monte Carlo ($M_c$) run. The reference distance is set to $d_0$=1 m, the reference path loss to $L_0$=40 dB, and the PLE was fixed to $\gamma$=2.5. However, to account for a realistic measurement model mismatch and test the robustness of the new algorithm to imperfect knowledge of the PLE, the true PLE was drawn from a uniform distribution on the interval [2.2, 2.8], i.e., $\gamma_{ij}$~µ[2.2, 2.8], ∀(i,j)∈ε. Finally, $\sigma_{n_{ij}}$=10 dB and $\kappa_{ij}$=25.9, which corresponds to the circular standard deviation of $\sigma_{m_{ij}}=\sigma_{v_{ij}}=\sigma_{ij}$=8 degrees, since $\sigma_{ij}^2$=1-$1_1(\kappa_{ij})/1_0(\kappa_{ij})$. The performance metric used here is the normalized root mean square error (NRMSE), defined as $$NRMSE = \sqrt{\sum_{j=1}^{M_c}\sum_{i=1}^{M}\frac{\|x_{ij} - \hat{x}_{ij}\|^2}{MM_c}},$$

where $\hat{x}_{ij}$ denotes the estimate of the true location of the i-th target, $x_{ij}$, in the j-th $M_c$ run.

The performance of the WLS estimator is compared to the existing SDP in [21] and LLS in [37] for RSS-AoA localization in cooperative WSNs. Furthermore, the results obtained by its counterpart that takes advantage of AoA-only observations, denoted by "$LS_{AOA}$", are included also in order to show the benefit of a hybrid approach in comparison to the classical one. Finally, the Cramer-Rao lower bound (CRLB) [34] is also included in all figures.

Figure 3:
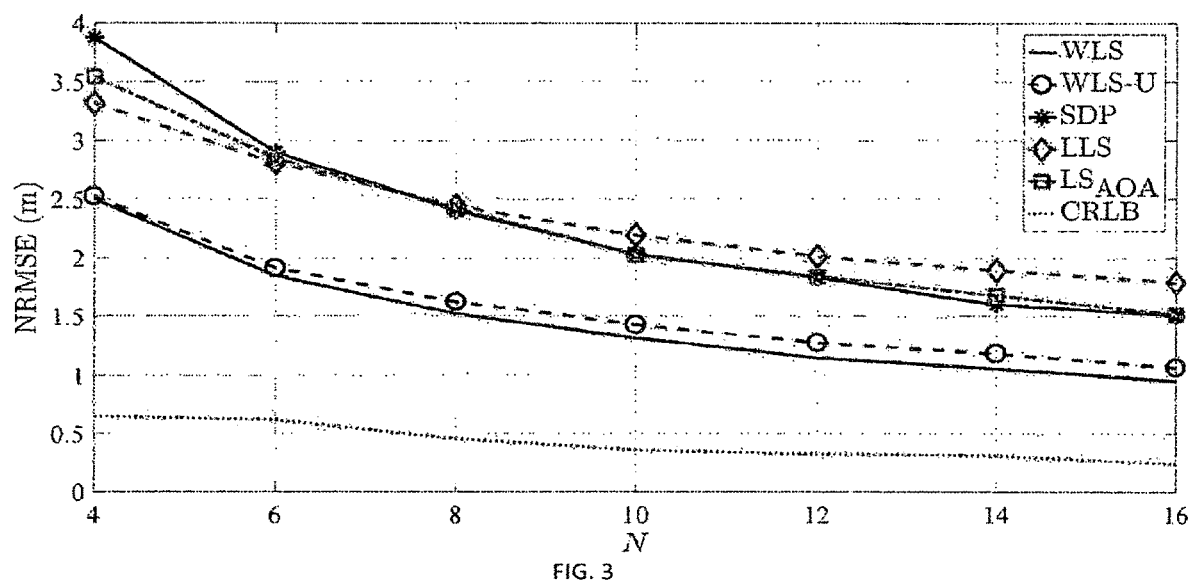
FIG. 3 shows the normalized mean square error (NRMSE) versus N comparison, for the case where M=30 and R=4 m. The PLE was fixed to $\gamma=2.5$. However, to account for a realistic measurement model mismatch and test the robustness of the new algorithm to imperfect knowledge of the PLE, the true PLE was drawn from a uniform distribution on the interval [2.2, 2.8], i.e., $\gamma_i \sim \mathcal{U}[2.2, 2.8]$, $\forall(i,j)\in\varepsilon$. All sensors were deployed randomly within a box with an edge length B=10 m, and the rest of the parameters were set as follows. $L_0=40$ dB, $d_0=1$ m, $M_c=50000$. Finally, $\sigma_{n_{ij}}=10$ dB and $\kappa_{ij}=25.9$, which corresponds to the circular standard deviation of $\sigma_{m_{ij}}=\sigma_{v_{ij}}=\sigma_{ij}=8$ degrees, since $\sigma_{ij}^2=1-I_1(\kappa_{ij})/I_0(\kappa_{ij})$.
Figure 4:
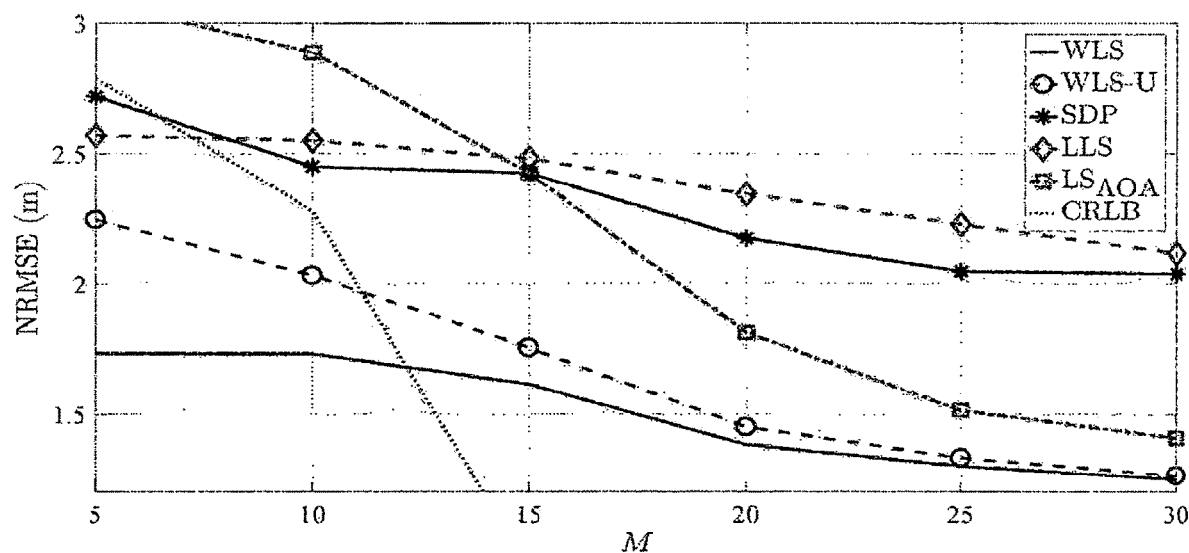
FIG. 4 shows the NRMSE versus M comparison, for the case where N=7, R=5 m, $\gamma=2.5$, $\gamma_i \sim \mathcal{U}[2.2, 2.8]$, $\forall(i,j)\in\varepsilon$, B=10 m, $L_0=40$ dB, $d_0=1$ m, $M_c=50000$, $\sigma_{n_{ij}}=10$ dB, and $\kappa_{ij}=25.9$.
Figure 5:
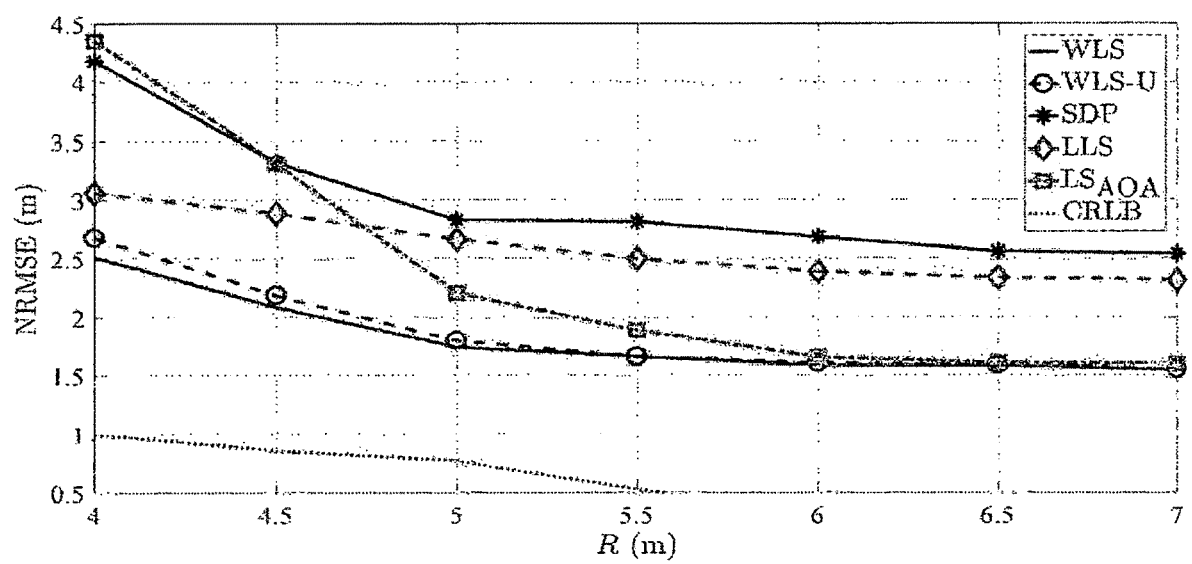
FIG. 5 shows the NRMSE versus R(m) comparison, for the case where N=5, M=20, $\gamma=2.5$, $\gamma_i \sim \mathcal{U}[2.2, 2.8]$, $\forall(i,j)\in\varepsilon$, B=10 m, $L_0=40$ dB, $d_0=1$ m, $M_c=50000$, $\sigma_{n_{ij}}=10$ dB, and θKhd ij=25.9.

FIGS. 3, 4 and 5 illustrate the NRMSE (m) versus N, M and R (m) comparison, respectively. One can see from these figures that all estimators exhibit natural behavior, and that the new estimator offers a significant gain over the remaining ones, especially for low quantities of the respective parameters, even when the transmit power is not known.

Figure 6:
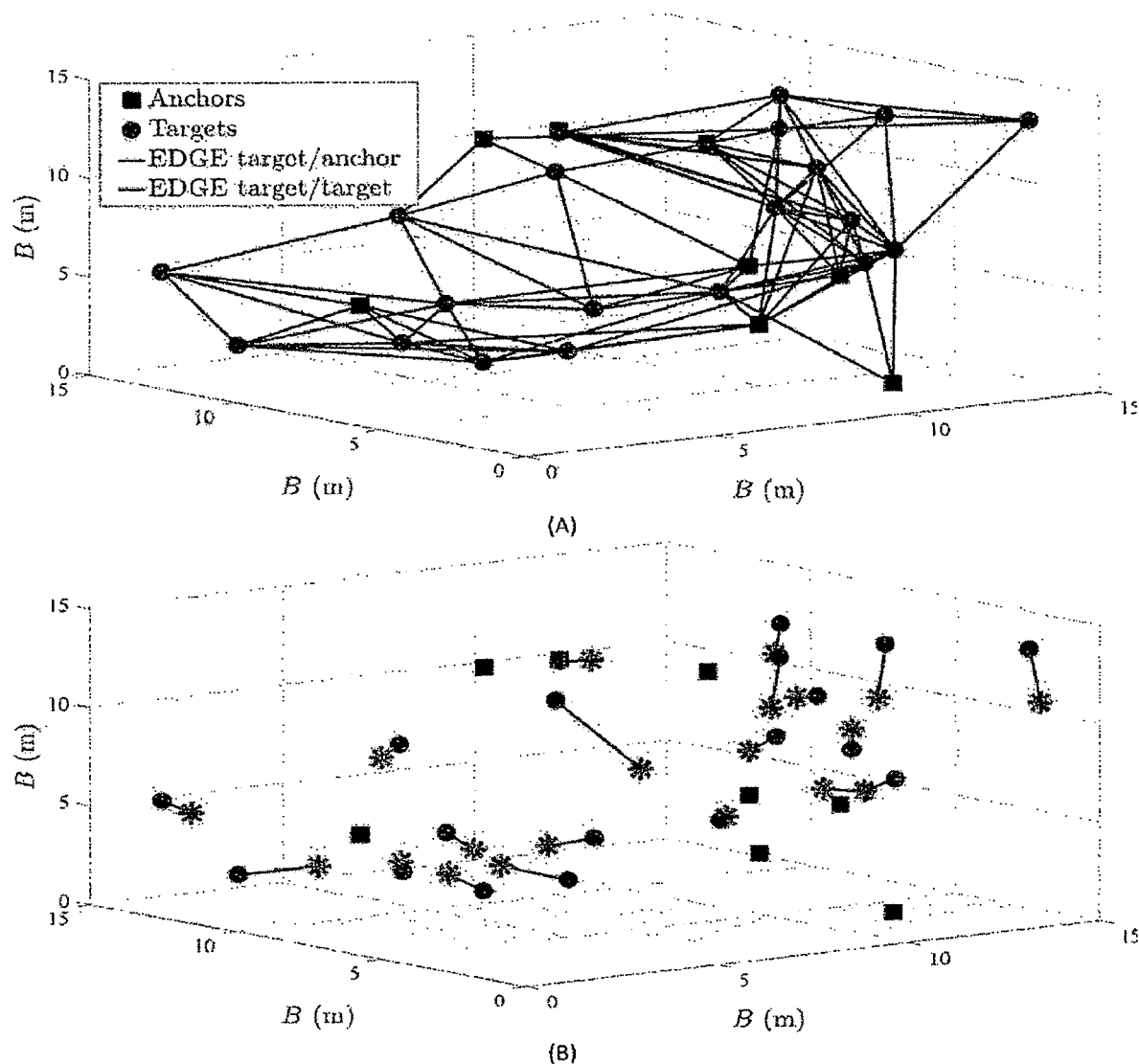
FIG. 6 illustrates of the estimation process by using WLS algorithm in a single Monte Carlo run for N=8, M=20, R=8 (m), $\gamma=2.5$, $\gamma_i \sim \mathcal{U}[2.2, 2.8]$, $\forall(i,j)\in\varepsilon$, B=10 m, $L_0=40$ dB, $d_0=1$ m, $\sigma_{n_{ij}}=10$ dB, and $\kappa_{ij}=25.9$. The part (a) of the figure shows a particular network example, whereas the part (b) of the figure shows the estimation results for all targets in the network individually.

FIG. 6 illustrates one particular output by WLS. It can be seen from the figure that the accuracy is very good in general, and that even the targets with no anchor neighbors (e.g., the two far-right top ones) can be localized fairly well.

The above description of illustrated embodiments is not intended to be exhaustive or limited by the disclosure. Some specific embodiments of various equivalent modifications are possible (and examples are described herein for illustrative purposes), as those skilled in the relevant art will recognize.

What is claimed is:

1. An apparatus for 3-D received signal strength/angle of arrival (RSS/AoA) information-based cooperative network localization for a sensor network with at least a sensor called anchor equipped with global navigation satellite system (GNSS) receiver and a set of sensors without GNSS receiver called targets that communicate between them through radio links comprising:

at least a directive or an antenna array in each sensor;
a central processing unit to process the received RSS information sent by each sensor and that computes the distance between the sensors;
the central processing unit configured to process the AoA information and compute the AoA of the incoming signal transmitted by each sensor present in the wireless network;
the central processing unit configured to compute a convertsion from Cartesian coordinates of the RSS and AoA information to spherical coordinates to merge the RSS and AoA information;
the central processing unit configured to classify the nearby sensors by introducing weights to be used in a weighted least squares (WLS) criterion employed in the computation of targets' locations estimates;
the central processing unit configured to compute simultaneously the estimated locations of all target sensors, based on the merged measurements of RSS and AoA, and the WLS criterion;
wherein, to compute the AOA of each incoming signal, to compute the conversion from Cartesian coordinates of the RSS and AoA information to spherical coordinates, to introduce the weights to be used in the WLS criterion and to silmultaneous compute the estimated locations of all target sensors, when transmitted power information $P_T$ is known, the central processing unit is further configured to:
a. first, from $$f(P_{ij} | X) = \frac{1}{\sqrt{2\pi\sigma_{n_{ij}}^2}}\exp\left\{-\frac{\left(P_{ij} - P_0 + 10\gamma\log_{10}\frac{d_{ij}}{d_0}\right)^2}{2\sigma_{n_{ij}}^2}\right\},$$

from where $d_o(d_0 \leq d_{ij})$ is a reference distance, $X=[x_1, x_2, \ldots, x_M]$, ($X \in \mathbb{R}^{3 \times M}$), $P_0$ is the reference RSS at distance $d_o$, $P_{ij}$ denotes the RSS at distance $d_{ij}$, $\gamma$ is the path loss exponent (PLE), and $d_{ij}$ is the distance between sensors i and j and $\sigma_{n_{ij}}^2$ represents the variance of the log-normal shadowing term, $n_{ij}$, modeled as zero-mean Gaussian random variable $n_{ij}$~N(O, $\sigma_{n_{ij}}^2$), compute the distance that best estimates $\|x_i - s_j\|$, with $x_i=[x_{ix}, x_{iy}, x_{iz}]^T$ and $s_j=[s_{jx}, s_{jy}, s_{jz}]^T$ denoting the coordinates of the i-th target and its j-th neighboring sensor, by $$\hat{d}_{ij} = d_0 10^{\frac{P_0 - P_{ij}}{10\gamma}}; \quad (7)$$

b. from $$f(\phi_{ij} | X) = \frac{1}{2\pi I_0(\kappa_{ij})}\exp\{\kappa_{ij}\cos(\phi_{ij} - \tilde{\phi}_{ij})\}, \text{ and}$$

$$f(\alpha_{ij} | X) = \frac{1}{2\pi I_0(\kappa_{ij})}\exp\{\kappa_{ij}\cos(\alpha_{ij} - \tilde{\alpha}_{ij})\},$$

where $\kappa_{ij}$ is the concentration parameter of the azimuth angle measurement noise, $m_{ij}$, and the elevation angle measurement noise, $v_{ij}$, modeled as zero-means von Mises random variables $m_{ij} \sim VM(0,\kappa_{ij})$, $v_{ij} \sim VM(0,\kappa_{ij})$, $I_0(*)$ is the modified Bessel function of first kind of order 0, and $\hat{\phi}_{ij}$ and $\hat{\alpha}_{ij}$ are respectively the true azimuth angle and the true elevation angle between the i-th target and its j-th neighboring sensor. compute the angles which estimate the azimuth angle, $\phi_{ij}$, and the elevation angle, $\alpha_{ij}$, between the i-th target and its j-th neighboring sensor, using the formulas $$\hat{\phi}_{ij} = \tan^{-1}\left(\frac{x_{iy} - s_{jy}}{x_{ix} - s_{jx}}\right), \quad (8a)$$

$$\hat{\alpha}_{ij} = \cos^{-1}\left(\frac{x_{iz} - s_{jz}}{\|x_i - s_j\|}\right), \quad (8b)$$

c. compute, from (7) and (8)

$$\lambda_{ij}\|x_i - s_j\| \approx \eta d_0, \quad (9)$$

$$c_{ij}^T(x_i - s_j) \approx 0, \quad (10a)$$

and $k^T(x_i - s_j) \approx \|x_i - s_j\|\cos(\alpha_{ij})$ (10b)

where $$\lambda_{ij} = 10^{\frac{P_{ij}}{10\gamma}}, \eta = 10^{\frac{P_0}{10\gamma}},$$

$c_{ij} = [-\sin(\phi_{ij}), \cos(\phi_{ij}), 0]^T$, and $k = [0,0,1]^T$;

d. apply the Cartesian to spherical coordinates conversion to (9) and (10b), and multiply with 1 (formed as $u_{ij}^T u_{ij}$, with $u_{ij} = [\cos(\phi_{ij})\sin(\alpha_{ij}), \sin(\phi_{ij})\sin(\alpha_{ij}), \cos(\alpha_{ij})]^T$ being the estimated unit direction vector), to get $$\lambda_{ij} u_{ij}^T r_{ij} u_{ij} \approx \eta d_0 \Leftrightarrow \lambda_{ij} u_{ij}^T(x_i - s_i) \approx \eta d_0, \quad (11)$$

and $$k^T r_{ij} u_{ij} \approx u_{ij}^T r_{ij} u_{ij} \cos(\alpha_{ij}) \Leftrightarrow (\cos(\alpha_{ij})u_{ij} - k)^T(x_i - s_j) \approx 0; \quad (12)$$

e. give more importance to nearby links, by introducing weights, $w = [\sqrt{\tilde{w}_{ij}}]$, with each $w_{ij}$ defined as $$w_{ij} = 1 - \frac{\hat{d}_{ij}}{\sum_{(i,j) \in \varepsilon} \hat{d}_{ij}}; \quad (13)$$

f. apply the weighted least squares (WLS) criterion to (11), (10a), (12), and (13), and obtain $$\hat{X} = \underset{X}{\operatorname{argmin}} \sum_{(i,j) \in \varepsilon} w_{ij}(\lambda_{ij} u_{ij}^T(x_i - s_j) - \eta d_0)^2 + \quad (14)$$

$$\sum_{(i,j) \in \varepsilon} w_{ij}(c_{ij}^T(x_i - s_j))^2 + \sum_{(i,j) \in \varepsilon} w_{ij}((\cos(\alpha_{ij})u_{ij} - k)^T(x_i - s_j))^2,$$

where $x = [x_1, x_2, \ldots, x_M]$, $(X \in \mathcal{E}_A^{3 \times M})$ and $\varepsilon$ denotes the tuple set of all sensors within communication range, and minimize $$\underset{x}{\operatorname{minimize}}\|W(Ax - b)\|^2, \quad (15)$$

where $x = [x_1, x_2, \ldots, x_M]^T$, $(x \in \mathcal{E}_A^{3M \times 1})$, $W = I_3 \otimes \operatorname{diag}(w)$, denoting the Kronecker product, and $A_{t,3(i-1)+1:3i} = \lambda_{ij} u_{ij}^T$, $b_t = \lambda_{ij} u_{ij}^T \alpha_{ij} + \eta d_0$, $\forall (i,j) \in \mathcal{E}_A$, $t = 1, \ldots, |\mathcal{E}_A|$;

$A_{t,3(i-1)+1:3i} = c_{ij}^T$, $b_t = c_{ij}^T \alpha_{ij}, \forall (i,j) \in \mathcal{E}_A$, $t = |\mathcal{E}_A| + 1, \ldots, 2|\mathcal{E}_A|$;

$A_{t,3(i-1)+1:3i} = (\cos(\alpha_{ij})u_{ij} - k)^T$, $b_t = (\cos(\alpha_{ij})u_{ij} - k)^T \alpha_j$, $\forall (i,j) \in \mathcal{E}_A$, $t = 2|\mathcal{E}_A| + 1, \ldots, 3|\mathcal{E}_A|$;

$A_{t,[3(i-1)+1:3i, 3(j-1)+1:3j]} = [\lambda_{ij} u_{ij}^T, -\lambda_{ij} u_{ij}^T]$, $b_t = \eta d_0$, $\forall (i,j) \in \mathcal{E}_T$, $t = 3|\mathcal{E}_A| + 1, \ldots, 3|\mathcal{E}_A| + |\mathcal{E}_T|$;

$A_{t,[3(i-1)+1:3i, 3(j-1)+1:3j]} = [c_{ij}^T, -c_{ij}^T]$, $b_t = 0$, $\forall (i,j) \in \mathcal{E}_T$, $t = 3|\mathcal{E}_A| + |\mathcal{E}_T| + 1, \ldots, 3|\mathcal{E}_A| |\mathcal{E}_T| + 2|\mathcal{E}_T|$;

$A_{t,[3(i-1)+1:3i, 3(j-1)+1:3j]} = [(\cos(\alpha_{ij})u_{ij} - k)^T, -(\cos(\alpha_{ij})u_{ij} - k)^T]$, $b_t = 0$, $\forall (i,j) \in \mathcal{E}_T$, $t = 3|\mathcal{E}_A| + 2|\mathcal{E}_T| + 1, \ldots, 3|\mathcal{E}_A| + 3|\mathcal{E}_T|$;

with $\mathcal{E}_A$ and $\mathcal{E}_T$ denoting the tuple sets of all target/anchor and target/target sensors within communication range of each other respectively, and $|*|$ representing the cardinality of a set, by computing $$\hat{x} = (A^T W^T W A)^{-1}(A^T W^T W b);$$

wherein the central processing unit, to compute the AOA of each incoming signal, to compute the conversion from Cartesian coordinates of the RSS and AoA information to spherical coordinates, to introduce the weights to be used in the WLS criterion and to silmultaneous compute the estimated locations of all target sensors, when transmitted power information $P_T$ is unknown, is further configured to:

g. compute from $$\hat{d}_{ij} = d_0 10^{\frac{P_0 - P_{ij}}{10\gamma}},$$

where $d_o(d_0 \leq d_{ij})$ is a reference distance, $P_0$ is the reference RSS at distance $d_o$, $P_{ij}$, denotes the RSS at distance $d_{ij}$, $\gamma$ is the path loss exponent (PLE), and $d_{ij}$ is the distance between sensors i and j $$\lambda_{ij}\|x_i - s_j\| \approx \eta d_\sigma, \quad (9)$$

$$c_{ij}^T(x_i - s_j) \approx 0, \quad (10a)$$

$$k^T(x_i - s_j) \approx \|x_i - s_j\|\cos(\alpha_{ij}), \quad (10b)$$

where $x_i = [x_{ix}, x_{iy}, x_{iz}]^T$ and $s_j = [s_{jx}, s_{jy}, s_{jz}]^T$ denote the coordinates of the i-th target and its j-th neighboring sensor, respectively, $$\lambda_{ij} = 10^{\frac{P_{ij}}{10\gamma}}, \eta = 10^{\frac{P_0}{10\gamma}},$$

$c_{ij} = [-\sin(\phi_{ij}), \cos(\phi_{ij}), 0]^T$, and $k = [0,0,1]^T$;

h. apply the Cartesian to spherical coordinate conversion to (9) and (10b), and multiply with 1 (formed as $u_{ij}^T u_{ij}$, with $u_{ij} = [\cos(\phi_{ij})\sin(\alpha_{ij}), \sin(\phi_{ij})\sin(\alpha_{ij}), \cos(\alpha_{ij})]^T$ being the estimated unit direction vector), to get $$\lambda_{ij} u_{ij}^T r_{ij} u_{ij} \approx \eta d_o \Leftrightarrow \lambda_{ij} u_{ij}^T(x_i - s_j) \approx \eta d_o, \quad (11)$$

and $$k^T r_{ij} u_{ij} \approx u_{ij}^T r_{ij} u_{ij} \cos(\alpha_{ij}) \Leftrightarrow (\cos(\alpha_{ij})u_{ij} - k)^T(x_i - s_j) \approx 0; \quad (12)$$

i. give more importance to nearby links, introducing weights, $\tilde{w}=[\sqrt{\tilde{w}_{ij}}]$, with each $\tilde{w}_{ij}$ defined as $$\tilde{w}_{ij} = 1 - \frac{P_{ij}}{\sum_{(i,j)\in\varepsilon} P_{ij}}; \quad (16)$$

j. apply the weighted least squares (WLS) criterion to (11), (10a), (12) and (16), to obtain the estimator $$\hat{X} = \underset{X-\eta}{\arg\min} \sum_{(i,j)\in\varepsilon} \tilde{w}_{ij}(\lambda_{ij}u_{ij}^T(x_i-s_j) - \eta d_0)^2 + \quad (17)$$
$$\sum_{(i,j)\in\varepsilon} \tilde{w}_{ij}(c_{ij}^T(x_i-s_j))^2 + \sum_{(i,j)\in\varepsilon} \tilde{w}_{ij}((\cos(\alpha_{ij})u_{ij}-k)^T(x_i-s_j))^2,$$

where $X=[x_1, x_2, \ldots, x_M]$, $(X \in \mathbb{R}^{3 \times M})$ and $\varepsilon$ denotes the tuple set of the all sensors within communication range, and minimize $$\underset{y}{\text{minimize}} \|\tilde{W}(\tilde{A}y - \tilde{b})\|^2, \quad (18)$$

where $y=[x_1, x_2, \ldots, x_M, \eta]^T$, $(y \in \mathbb{R}^{(3M+1)\times 1})$, $\tilde{W}=I_3 \otimes \text{diag}(\tilde{w})$, with $\otimes$ denoting the Kronecker product, and $\tilde{A}_{t,[3(i-1)+1:3i, 3M+1]}=[\lambda_{ij}u_{ij}^T, -d_0]$, $\tilde{b}_t=\lambda_{ij}u_{ij}^T\alpha_{ij}$; $\forall(i,j)\in \mathcal{E}_A$, $t=1, \ldots, |\mathcal{E}_A|$;

$\tilde{A}_{t,[3(i-1)+1:3i, 3M+1]}=[c_{ij}^T, 0]$, $\tilde{b}_t=c_{ij}^T\alpha_{ij}$, $\forall(i,j) \in \mathcal{E}_A$, $t=|\mathcal{E}_A|+1, \ldots, 2|\mathcal{E}_A|$;

$\tilde{A}_{t,[3(i-1)+1:3i, 3M+1]}=[(\cos(\alpha_{ij})u_{ij}-k)^T, 0]$, $\tilde{b}_t=(\cos(\alpha_{ij})u_{ij}-k)^T\alpha_j$, $\forall(i,j)\in\mathcal{E}_A$, $t=2|\mathcal{E}_A|+1, \ldots, 3|\mathcal{E}_A|$;

$\tilde{A}_{t,[3(i-1)+1:3i, 3(j-1)+1:3j, 3M+1]}=[\lambda_{ij}u_{ij}^T, -\lambda_{ij}u_{ij}^T, -d_0]$, $\tilde{b}_t=0$, $\forall(i,j)\in\mathcal{E}_T$, $t=3|\mathcal{E}_A|+1, \ldots, 3|\mathcal{E}_A|+|\mathcal{E}_T|$;

$\tilde{A}_{t,[3(i-1)+1:3i, 3(j-1)+1:3j, 3M+1]}=[c_{ij}^T, -c_{ij}^T, 0]$, $\tilde{b}_t=0$, $\forall(i,j)\in\mathcal{E}_T$, $t=3|\mathcal{E}_A|+|\mathcal{E}_T|+z1, \ldots, 3|\mathcal{E}_A|+2|\mathcal{E}_T|$;

$\tilde{A}_{t,[3(i-1)+1:3i, 3(j-1)+1:3j, 3M+1]}=[(\cos(\alpha_{ij})u_{ij}-k)^T, -(\cos(\alpha_{ij})u_{ij}-k)^T, 0]$, $\tilde{b}_t=0$, $\forall(i,j)\in\mathcal{E}_T$, $t=3|\mathcal{E}_A|+2|\mathcal{E}_T|+1, \ldots, 3|\mathcal{E}_A|+2|\mathcal{E}_T|+1, \ldots, 3|\mathcal{E}_A|+3|\mathcal{E}_T|$;

with $\mathcal{E}_A$ and $\mathcal{E}_T$ denoting the tuple sets of all target/anchor and target/target sensors within communication range of each other respectively, and |*| representing the cardinality of a set, by computing $\hat{y}=(\tilde{A}^T\tilde{W}^T\tilde{W}\tilde{A})^-(\tilde{A}^T\tilde{W}^T\tilde{W}\tilde{b})$.

2. A method for 3-D received signal strength/angle of arrival (RSS/AoA) information-based cooperative network localization for a sensor network with at least a sensor called anchor equipped with global navigation satellite system (GNSS) receiver and a set of sensors without GNSS receiver called targets that communicate between them through radio links comprising:

processing the RSS information and computing the distance between a pair of sensors;

computing the AoA information of the incoming signal transmitted by each sensor present in the wireless network;

computing a conversion from Cartesian coordinates of the RSS and AoA information to spherical coordinates to merge the RSS and AoA information;

assigning weights to the radio links to reinforce the importance of the nearby radio links, these weights being used in a weighted least squares (WLS) criterion employed in the computation of targets' locations estimates;

computing simultaneously all the unknown target locations, without resorting to any relaxation technique, based on the acquired AoA measurements and the fusion of the RSS and AoA information;

wherein, when transmitted power information $P_T$ is known, the computation of AoA information of each incoming signal, the computation of the conversion from Cartesian to spherical coordinates of RSS and AoA information, the assignment of weights to radio links used in the WLS criterion and the simultaneous computation of all the unknown target locations, comprises the following steps:

a. first, from $$f(P_{ij} | X) = \frac{1}{\sqrt{2\pi\sigma_{n_{ij}}^2}} \exp\left\{-\frac{\left(P_{ij} - P_0 + 10\gamma \log_{10}\frac{d_{ij}}{d_0}\right)^2}{2\sigma_{n_{ij}}^2}\right\},$$

where $d_o(d_o \le d_{ij})$ is a reference distance, where $X=[x_1, x_2, \ldots, x_M]$, $(X \in \mathbb{R}^{3 \times M})$, $P_0$ is the reference RSS at distance $d_o$, $P_{ij}$ denotes the RSS at distance $d_{ij}$, $\gamma$ is the path loss exponent (PLE), and $d_{ij}$ is the distance between sensors i and j, and $\sigma_{n_{ij}}^2$ represents the variance of the log-normal shadowing term, $n_{ij}$ modeled as zero-mean Gaussian random variable $n_{ij} \sim N(0, \sigma_{n_{ij}}^2)$, compute the distance that best estimates $\|x_i - s_j\|$, with $x_i=[x_{ix}, x_{iy}, x_{iz}]^T$ and $s_j=[s_{jx}, s_{jy}, s_{jz}]^T$ denoting the coordinates of the i-th target and its j-th neighboring sensor, by $$\hat{d}_{ij} = d_0 10^{\frac{P_0 - P_{ij}}{10\gamma}}; \quad (7)$$

b. from $$f(\phi_{ij} | X) = \frac{1}{2\pi I_0(\kappa_{ij})} \exp\{\kappa_{ij}\cos(\phi_{ij} - \bar{\phi}_{ij})\}, \text{ and}$$

$$f(\phi_{ij} | X) = \frac{1}{2\pi I_0(\kappa_{ij})} \exp\{\kappa_{ij}\cos(\alpha_{ij} - \bar{\alpha}_{ij})\},$$

where $\kappa_{ij}$ is the concentration parameter of the azimuth angle measurement noise, $m_{ij}$, and the elevation angle measurement noise, $v_{ij}$, modeled as zero-means von Mises random variables $m_{ij} \sim \text{VM}(0, \kappa_{ij})$, $v_{ij} \sim \text{FM}(0, \kappa_{ij})$, $I_0(*)$ is the modified Bessel function of first kind of order 0, and $\phi_{ij}$ and $\alpha_{ij}$ are respectively the true azimuth angle and the true elevation angle between the i-th target and its j-th neighboring sensor. compute the angles which estimate the azimuth angle, $\phi_{ij}$, and the elevation angle, $\alpha_{ij}$, between the i-th target and its j-th neighboring sensor, using the formulas $$\hat{\phi}_{ij} = \tan^{-1}\left(\frac{x_{iy}-s_{jy}}{x_{ix}-s_{jx}}\right), \tag{8a}$$

$$\hat{\alpha}_{ij} = \cos^{-1}\left(\frac{x_{iz}-s_{jz}}{\|x_i-s_j\|}\right), \tag{8b}$$

c. from (7) and (8), compute $$\lambda_{ij}\|x_i-s_j\|\approx \eta d_0, \tag{9}$$

$$c_{ij}^T(x_i-s_j)\approx 0, \tag{10a}$$

and $k^T(x_i-s_j)\approx \|x_i-s_j\|\cos(\alpha_{ij})$, (10b)

where $$\lambda_{ij} = 10^{\frac{P_{ij}}{10\gamma}}, \eta = 10^{\frac{P_0}{10\gamma}},$$

$c_{ij}=[-\sin(\phi_{ij}), \cos(\phi_{ij}), 0]^T$, and $k=[0,0,1]^t$;

d. apply the Cartesian to spherical coordinates conversion to (9) and (10b), and multiply with 1 (formed as $u_{ij}^T u_{ij}$, with $u_{ij}=[\cos(\phi_{ij})\sin(\alpha_{ij}), \sin(\phi_{ij})\sin(\alpha_{ij}), \cos(\alpha_{ij})]^T$ being the estimated unit direction vector), to get $$\lambda_{ij}u_{ij}^T r_{ij}u_{ij}\approx \eta d_o \Leftrightarrow \lambda_{ij}u_{ij}^T(x_i-s_j)\approx \eta d_o, \tag{11}$$

and $$k^T r_{ij} u_{ij} \approx u_{ij}^T r_{ij} u_{ij}\cos(\alpha_{ij}) u_{ij}-k)^T(x_i-s_j)\approx 0; \tag{12}$$

e. give more importance to nearby links, by introducing weights, $w=[\sqrt{\tilde{w}_{ij}}]$, with each $w_{ij}$ defined as $$w_{ij} = 1 - \frac{\hat{d}_{ij}}{\sum_{(i,j)\in\varepsilon}\hat{d}_{ij}}; \tag{13}$$

f. apply the weighted least squares (WLS) criterion to (11), (10a), (12), and (13), and obtain $$\hat{X} = \operatorname*{argmin}_{x} \sum_{(i,j)\in\varepsilon} w_{ij}(\lambda_{ij}u_{ij}^T(x_i-s_j)-\eta d_0)^2 + \tag{14}$$

$$\sum_{(i,j)\in\varepsilon} w_{ij}(c_{ij}^T(x_i-s_j))^2 + \sum_{(i,j)\in\varepsilon} w_{ij}((\cos(\alpha_{ij})u_{ij}-k)^T(x_i-s_j))^2,$$

where $X=[x_1,x_2, \ldots, x_M]$, $(X\in\mathbb{R}^{3\times M})$ and $\varepsilon$ denotes the tuple set of all sensors within communication range, and minimize $$\text{minimize } \|W(Ax-b)\|^2, \tag{15}$$

where $x=[x_1,x_2, \ldots, x_M]^T$, $(x\in\mathbb{R}^{3M\times 1})$, $W=I_3\otimes$ denoting the Kronecker product, and $A_{t,3(i-1)+1:3i}=\lambda_{ij}u_{ij}^T$, $b_t=\lambda_{ij}u_{ij}^T a + \eta d_0$, $\forall (i,j)\in \mathcal{E}_{\mathcal{A}}$, $t=1,\ldots,|\mathcal{E}_{\mathcal{A}}|$;

$A_{t,3(i-1)+1:3i}=c_{ij}^T$, $b_t=c_{ij}^T a_j$, $\forall (i,j)\in \mathcal{E}_{\mathcal{A}}$, $t=|\mathcal{E}_{\mathcal{A}}|+1,\ldots,2|\mathcal{E}_{\mathcal{A}}|$;

$A_{t,3(i-1)+1:3i}=(\cos(\alpha_{ij})u_{ij}-k)^T$, $b_t=(\cos(\alpha_{ij})u_{ij}-k)^T a_j$, $\forall (i,j)\in \mathcal{E}_{\mathcal{A}}$, $t=2|\mathcal{E}_{\mathcal{A}}|+1,\ldots,3|\mathcal{E}_{\mathcal{A}}|$;

$A_{t,[3(i-1)+1:3i, 3(j-1)+1:3j]}=[\lambda_{ij}u_{ij}^T, -\lambda_{ij}u_{ij}^T]$, $b_t=\eta d_0$, $\forall (i,j)\in \mathcal{E}_{\mathcal{T}}$, $t=3|\mathcal{E}_{\mathcal{A}}|+1,\ldots,3|\mathcal{E}_{\mathcal{A}}|+|\mathcal{E}_{\mathcal{T}}|$;

$A_{t,[3(i-1)+1:3i, 3(j-1)+1:3j]}=[c_{ij}^T, -c_{ij}^T]$, $b_t=0$, $\forall (i,j)\in \mathcal{E}_{\mathcal{T}}$, $t=3|\mathcal{E}_{\mathcal{A}}|+|\mathcal{E}_{\mathcal{T}}|+1,\ldots,3|\mathcal{E}_{\mathcal{A}}|+2|\mathcal{E}_{\mathcal{T}}|$;

$A_{t,[3(i-1)+1:3i, 3(j-1)+1:3j]}[(\cos(\alpha_{ij})u_{ij}-k)^T, -(\cos(\alpha_{ij})u_{ij}-k)^T]$, $b_t=0$, $\forall (i,j)\in \mathcal{E}_{\mathcal{T}}$, $t=3|\mathcal{E}_{\mathcal{A}}|+1,\ldots,3|\mathcal{E}_{\mathcal{A}}|+3|\mathcal{E}_{\mathcal{T}}|$;

with $\mathcal{E}_{\mathcal{A}}$ and $\mathcal{E}_{\mathcal{T}}$ denoting the tuple sets of all target/anchor and target/target sensors within communication range of each other respectively, and $|*|$ representing the cardinality of a set, by computing $$\hat{x}=(A^T W^T W A)^{-1}(A^T W^T W b);$$

computing simultaneously all the unknown target locations, without resorting to any relaxation technique, based on the acquired AoA measurements and the fusion of the RSS and AoA information wherein, when the transmitted power information $P_T$ is unknown, the computation of AoA information of each incoming signal, the computation of a conversion from Cartesian to spherical coordinates of RSS and AoA information, the assignment of weights to radio links used in the WLS criterion and the simultaneous computation of all the unknown target locations, comprises the following steps:

g. from $$\hat{d}_{ij} = d_0 10^{\frac{P_0-P_{ij}}{10\gamma}},$$

where $d_o$ ($d_o \leq d_{ij}$) is a reference distance, $P_0$ is the reference RSS at distance $d_o$, $P_{ij}$ denotes the RSS at distance $d_{ij}$, $\gamma$ is the path loss exponent (PLE), and $d_{ij}$ is the distance between sensors i and j compute $$\lambda_{ij}\|x_i-s_j\|\approx \eta d_o, \tag{9}$$

$$c_{ij}^T(x_i-s_j)\approx 0, \tag{10a}$$

$$k^T(x_i-s_j)\approx \|x_i-s_j\|\cos(\alpha_{ij}), \tag{10b}$$

where $x_i=[x_{ix},x_{iy},x_{iz}]^T$ and $s_j=[s_{jx},s_{jy},s_{jz}]^T$ denote the coordinates of the i-th target and its j-th neighboring sensor, respectively, $$\lambda_{ij} = 10^{\frac{P_{ij}}{10\gamma}}, \eta = 10^{\frac{P_0}{10\gamma}},$$

$c_{ij}=[-\sin(\phi_{ij}),\cos(\phi_{ij}),0]^T$, and $k=[0,0,1]^T$;

h. apply the Cartesian to spherical coordinate conversion to (9) and (10b), and multiply with 1 (formed as $u_{ij}^T u_{ij}$, with $u_{ij}=[\cos(\phi_{ij})\sin(\alpha_{ij}), \sin(\phi_{ij})\sin(\alpha_{ij}), \cos(\alpha_{ij})]^T$ being the estimated unit direction vector), to get $$\lambda_{ij}u_{ij}^T r_{ij}u_{ij}\approx \eta d_o \Leftrightarrow \lambda_{ij}u_{ij}^T(x_i-s_j)\approx \eta d_o, \tag{11}$$

and $$k^T r_{ij}u_{ij}\approx u_{ij}^T r_{ij}u_{ij}\cos(\alpha_{ij}) \Leftrightarrow (\cos(\alpha_{ij})u_{ij}-k)^T(x_i-s_j)\approx 0; \tag{12}$$

i. give more importance to nearby links, introducing weights, $\tilde{w}=[\sqrt{\_e,otl}w_{ij}]$, with each $w_{ij}$ defined as $$\tilde{w}_{ij} = \frac{P_{ij}}{\sum_{(i,j)\in\varepsilon} P_{ij}}; \tag{16}$$

j. apply the weighted least squares (WLS) criterion to (11), (10a), (12) and (16), to obtain the estimator $$\hat{X} = \underset{x,\eta}{\operatorname{argmin}} \sum_{(i,j)\in\varepsilon} \tilde{w}_{ij}(\lambda_{ij}u_{ij}^T(x_i - s_j) - \eta d_0)^2 + \qquad (17)$$
$$\sum_{(i,j)\in\varepsilon} \tilde{w}_{ij}(c_{ij}^T(x_i - s_j))^2 + \sum_{(i,j)\in\varepsilon} \tilde{w}_{ij}((\cos(\alpha_{ij})u_{ij} - k)^T(x_i - s_j))^2,$$

where $X=[x_1, x_2, \ldots, x_M]$, ($X \in \mathbb{R}^{3 \times M}$) and $\varepsilon$ a denotes the tuple set of the all sensors within communication range, and minimize $$\underset{y}{\operatorname{minimize}} \|\tilde{W}(\tilde{A}y - \tilde{b})\|^2, \qquad (18)$$

where $y=[x_1, x_2, \ldots, x_M, \eta]^T$, ($y \in \mathbb{R}^{(3M+1) \times 1}$), $\tilde{W} = I_3 \otimes \operatorname{diag}(\hat{w})$, with $\otimes$ denoting the Kronecker product, and $\tilde{A}_{t,[3(i-1)+1:3i,\ 3M+1]} = [\lambda_{ij}u_{ij}^T, -d_0]$, $\tilde{b}_t = \lambda_{ij}u_{ij}^T\alpha_{ij}$, $\forall(i,j) \in \mathcal{E}_\mathcal{A}$, $t=1, \ldots, |\mathcal{E}_T|$;

$\tilde{A}_{t,[3(i-1)+1:3i,\ 3M+1]} = [c_{ij}^T, 0]$, $\tilde{b}_t = c_{ij}^T\alpha_{ij}$, $\forall(i,j) \in \mathcal{E}_\mathcal{A}$, $t=|\mathcal{E}_\mathcal{A}|+1, \ldots, 2|\mathcal{E}_\mathcal{A}|$;

$\tilde{A}_{t,[3(i-1)+1:3i,\ 3M+1]} = [(\cos(\alpha_{ij})u_{ij} - k)^T, 0]$, $\tilde{b}_t = (\cos(\alpha_{ij})$ $u_{ij}-k)^T\alpha_j$, $\forall(i,j) \in \mathcal{E}_\mathcal{A}$, $t=2|\mathcal{E}_\mathcal{A}|+1, \ldots, 3|\mathcal{E}_\mathcal{A}|$;

$\tilde{A}_{t,[3(i-1)+1:3i,\ 3(j-1)+1:3j,\ 3M+1]} = [\lambda_{ij}u_{ij}^T, -\lambda_{ij}u_{ij}^T, -d_0]$, $\tilde{b}hd\ t=0$, $\forall(i,j) \in \mathcal{E}_T$, $t=3|\mathcal{E}_\mathcal{A}|+1, \ldots, 3|\mathcal{E}_\mathcal{A}|+|\mathcal{E}_T|$;

$\tilde{A}_{t,[3(i-1)+1:3i,\ 3(j-1)+1:3j,\ 3M+1]} = [c_{ij}^T, -c_{ij}^T, 0]$, $\tilde{b}_t = 0$, $\forall(i,j) \in \mathcal{E}_T$, $t=3|\mathcal{E}_\mathcal{A}|+|\mathcal{E}_T|+1, \ldots, 3|\mathcal{E}_\mathcal{A}|+2|\mathcal{E}_T|$;

$\tilde{A}_{t,[3(i-1)+1:3i,\ 3(j-1)+1:3j,\ 3M+1]} = [(\cos(\alpha_{ij})u_{ij}-k)^T, -(\cos(\alpha_{ij})u_{ij}-k)^T, 0]$, $\tilde{b}_t = 0$, $\forall(i,j) \in \mathcal{E}_T$, $t=3|\mathcal{E}_\mathcal{A}|+2|\mathcal{E}_T|+1, \ldots 3|\mathcal{E}_\mathcal{A}|+3|\mathcal{E}_T|$;

with $\mathcal{E}_\mathcal{A}$ and $\mathcal{E}_T$ denoting the tuple sets of all target/anchor and target/target sensors within communication range of each other respectively, and |*| representing the cardinality of a set, by computing $\hat{y} = (\tilde{A}^T \tilde{W}^T \tilde{W} \tilde{A})^{-1} (\tilde{A}^T \tilde{W}^T \tilde{W} \tilde{b})$.

3. A method for 3-D received signal strength/angle of arrival (RSS/AoA) information based cooperative network localization as in claim 2 in which the computational complexity is always linear in the number of sensors.

* * * * *